US009388303B2

United States Patent
Nasu et al.

(10) Patent No.: US 9,388,303 B2
(45) Date of Patent: Jul. 12, 2016

(54) POLYETHYLENE RESIN COMPOSITION, MICROPOROUS FILM AND METHOD FOR MANUFACTURING THE MICROPOROUS FILM, AND SEPARATOR FOR BATTERY

(71) Applicant: Asahi Kasei Chemicals Corporation, Tokyo (JP)

(72) Inventors: Hideki Nasu, Tokyo (JP); Akio Fujiwara, Tokyo (JP); Ryoji Tanaka, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 57 days.

(21) Appl. No.: 14/476,821

(22) Filed: Sep. 4, 2014

(65) Prior Publication Data

US 2015/0065595 A1 Mar. 5, 2015

(30) Foreign Application Priority Data

Sep. 5, 2013 (JP) .................................. 2013-183906
Dec. 20, 2013 (JP) .................................. 2013-264114

(51) Int. Cl.
| | | |
|---|---|---|
| C08L 23/00 | (2006.01) | |
| C08L 23/06 | (2006.01) | |
| C08F 110/02 | (2006.01) | |
| H01M 2/14 | (2006.01) | |
| H01M 2/16 | (2006.01) | |

(52) U.S. Cl.
CPC ............... *C08L 23/06* (2013.01); *H01M 2/145* (2013.01); *H01M 2/1653* (2013.01); *C08F 2410/04* (2013.01); *C08J 2323/06* (2013.01)

(58) Field of Classification Search
None
See application file for complete search history.

(56) References Cited

U.S. PATENT DOCUMENTS

| | | | |
|---|---|---|---|
| 6,749,961 B1 | 6/2004 | Nguyen et al. | |
| 2008/0161474 A1* | 7/2008 | Shimouse | C08L 23/12 524/449 |
| 2009/0105407 A1* | 4/2009 | Karjala | C08F 10/00 524/547 |
| 2013/0337311 A1 | 12/2013 | Itou | |

FOREIGN PATENT DOCUMENTS

| | | |
|---|---|---|
| JP | 4059641 B2 | 3/2008 |
| JP | 2010-209135 A | 9/2010 |
| JP | 2010-540744 A | 12/2010 |
| JP | 2012-092254 A | 5/2012 |
| JP | 5164296 B2 | 3/2013 |
| WO | 2009/044227 A1 | 4/2009 |

* cited by examiner

*Primary Examiner* — Kara Boyle
(74) *Attorney, Agent, or Firm* — Morgan, Lewis & Bockius LLP

(57) ABSTRACT

The present disclosure relates to a polyethylene resin composition contains an ethylene homopolymer.

9 Claims, 3 Drawing Sheets

POLYETHYLENE RESIN COMPOSITION, MICROPOROUS FILM AND METHOD FOR MANUFACTURING THE MICROPOROUS FILM, AND SEPARATOR FOR BATTERY

TECHNICAL FIELD

The present invention relates to a polyethylene resin composition, a microporous film and a method for manufacturing the microporous film, and a separator for a battery.

BACKGROUND ART

Polyolefin microporous films are broadly used as separation and permselective separation membranes, separator materials and the like for various types of substances, and broadly utilized in medical applications such as microfiltration membranes, electric material applications such as separators for fuel cells and separators for capacitors, and the like. Among these applications, the polyolefin microporous films are used especially suitably as separators for lithium ion batteries of mobile devices such as notebook personal computers, cell phones and digital cameras. In recent years, along with broadening of demands for industrial batteries, secondary batteries as housing backup power sources, and vehicular large-size batteries for electric automobiles, hybrid automobiles and the like, higher performance has been demanded also on separators.

Separators for batteries are required to have a function as a separator to separate a positive electrode and a negative electrode and permeate ions only, and additionally have a shutdown function (a function of clogging pores at a temperature lower than a thermal runaway temperature) to close pores due to melting of the pores when a large current flows to thereby prevent the cell reaction from runaway, and required to be thin membranes and have a high mechanical strength. Further in vehicular batteries, since the electrode area is enlarged for making the batteries of a high-output, and the proportion of the cost of their separators accounting for the whole cost of the batteries increases with the enlargement, the thickness reduction, the high productivity and the like of the separators are demanded.

Examples of methods for manufacturing a polyolefin microporous film include methods of Patent Literatures 1 to 4. Patent Literature 1 discloses a manufacture technology in which a raw film before being provided with pores is cold-stretched in MD direction and thereafter heat-stretched in MD direction and further heat-stretched in TD direction to thereby improve the air permeation with the dimensional stability being maintained. Patent Literature 2 discloses a method of using a kind of polyethylene having a specific molecular weight, or as required, concurrently using a polyethylene having a higher molecular weight, to thereby improve permeation and mechanical properties. Patent Literature 3 discloses a method of manufacturing a microporous film having the air permeation by using a composition having an elongation viscosity to a specific shearing viscosity. Patent Literature 4 discloses a method of decreasing the shutdown temperature by blending a high-density polyethylene and a polyethylene wax.

CITATION LIST

Patent Literature

[Patent Literature 1] Japanese Patent No. 5164296
[Patent Literature 2] National Publication of International Patent Application No. 2010-540744
[Patent Literature 3] Japanese Patent Laid-Open No. 2010-209135
[Patent Literature 4] Japanese Patent No. 4059641

SUMMARY OF INVENTION

Technical Problem

However, technical progresses advance the downsizing of batteries and the thickness reduction of microporous films, and higher air permeation, mechanical strength and high processability have been demanded on separators. The methods of Patent Literatures 1 to 4, however, cannot always meet these requirements.

The present invention has been achieved in consideration of the above-mentioned problems, and provides a polyethylene resin composition excellent in the processability and capable of providing a microporous film excellent in the air permeation and the mechanical strength, a microporous film obtained using the polyethylene resin composition as a raw material, and a method for manufacturing the microporous film, and a separator for a battery.

Solution to Problem

As a result of exhaustive studies to solve the above-mentioned problems, the present inventors have found that a polyethylene resin composition composed of an ethylene homopolymer can solve the above-mentioned problems, the polyethylene resin composition having a specific melt flow rate (hereinafter, abbreviated to MFR), a specific molecular weight distribution, and a specific elution volume measured by cross-fractionation chromatography (CFC); and these findings have led to the completion of the present invention.

That is, the present invention is as follows.

[1]

A polyethylene resin composition comprising an ethylene homopolymer and having:

a melt flow rate of 0.10 to 0.60 g/10 min;

a molecular weight distribution (Mw/Mn) of 6.0 to 20;

a density of 956 to 970 kg/m$^3$; and in a cross-fractionation chromatography measurement using orthodichlorobenzene, a cumulative elution volume of 40° C. or more and less than 91° C. of 2.0% by mass or more and 15% by mass or less of a total elution volume;

a cumulative elution volume of 91° C. or more and less than 100° C. of 40% by mass or more and 60% by mass or less of the total elution volume;

a cumulative elution volume of 100° C. or more and less than 105° C. of 30% by mass or more and 55% by mass or less of the total elution volume; and a cumulative elution volume of 105° C. or more and less than 120° C. of 5.0% by mass or less of the total elution volume.

[2]

The polyethylene resin composition according to the above [1], wherein the ethylene homopolymer comprises: 30 to 70% by mass of a component (A) composed of an ethylene homopolymer having a melt flow rate of 3.0 to 300 g/10 min and a density of 962 to 974 kg/m$^3$, and 70 to 30% by mass of a component (B) composed of an ethylene homopolymer having a melt flow rate different from the melt flow rate of the component (A).

[3]

The polyethylene resin composition according to the above [1] or [2], comprising 5.0% by mass or less of an ethylene homopolymer component having a molecular weight in terms of polyethylene of 1,000,000 or more.

[4]

A microporous film comprising the polyethylene resin composition according to any one of the above [1] to [3].

[5]

The microporous film according to the above [4], being obtained by a stretching pore-opening method.

[6]

A separator for a battery comprising the microporous film according to the above [4] or [5].

[7]

A method for manufacturing a microporous film comprising a step of opening pores in the polyethylene resin composition according to any one of the above [1] to [3] by a stretching pore-opening method.

Advantageous Effects of Invention

The present invention can provide a polyethylene resin composition excellent in the processability and capable of providing a microporous film excellent in the air permeation and the mechanical strength, a microporous film obtained using the polyethylene resin composition as a raw material, and a method for manufacturing the microporous film, and a separator for a battery.

DESCRIPTION OF EMBODIMENT

Figure 1:
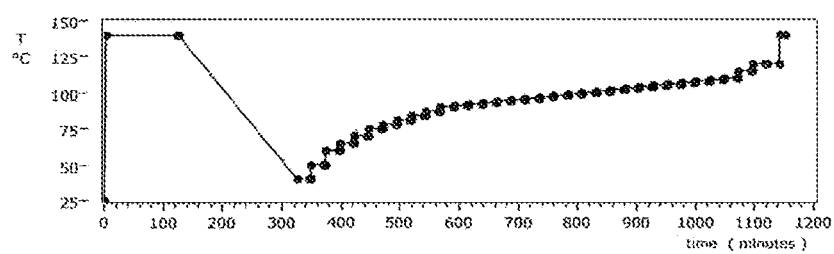
FIG. 1 is a temperature profile of a column in a CFC measurement.

Hereinafter, an embodiment to carry out the present invention (hereinafter, referred to as "the present embodiment") will be described specifically, but the present invention is not limited thereto, and various changes and modifications may be made without departing from its gist.

A polyethylene resin composition according to the present embodiment relates to a polyethylene resin composition comprising an ethylene homopolymer and having:

a melt flow rate of 0.10 to 0.60 g/10 min;
a molecular weight distribution (Mw/Mn) of 6.0 to 20;
a density of 956 to 970 kg/m$^3$; and
in a cross-fractionation chromatography measurement (hereinafter, also referred to as "CFC measurement") using orthodichlorobenzene, a cumulative elution volume of 40° C. or more and less than 91° C. of 2.0% by mass or more and 15% by mass or less of the total elution volume;

a cumulative elution volume of 91° C. or more and less than 100° C. of 40% by mass or more and 60% by mass or less of the total elution volume;

a cumulative elution volume of 100° C. or more and less than 105° C. of 30% by mass or more and 55% by mass or less of the total elution volume; and a cumulative elution volume of 105° C. or more and less than 120° C. of 5.0% by mass or less of the total elution volume.

A polyethylene resin composition according to the present embodiment may be composed of one or two or more ethylene homopolymers. Specifically, the polyethylene resin composition may be a resin composition containing a component (A) and/or a component (B) described later, or a resin composition composed of a component (A) and/or a component (B) described later. The above requirement will be described hereinafter.

[Ethylene Homopolymer]

An ethylene homopolymer is a polymer containing ethylene alone as a monomer component, and refers to a polymer containing substantially no α-olefin such as propylene, butene-1 and hexene-1 as a monomer component. Here, "containing substantially no" refers to that the content of an α-olefin polymerization unit is 0.10% by mol or less with respect to an ethylene polymerization unit. The measurement of the content of an α-olefin unit can be carried out according to a method disclosed in G. J. Ray et al., Macromolecules, 10, 773 (1977). Specifically, the content of an α-olefin polymerization unit can be calculated from an integrated intensity by using a signal of methylene carbon observed in a $^{13}$C-NMR spectrum. More specifically, the content can be measured by a method described in Examples.

Use of a polyethylene resin composition containing an ethylene homopolymer having few entanglements of molecular chains makes it easy for cracks to be generated in a cold stretching step when a microporous film is obtained. Thereby, sufficient pore-opening properties can be obtained in a heat stretching step thereafter, and thus the air permeability of the obtained microporous film increases. Being an ethylene homopolymer is preferable also from the viewpoint of heat resistance properties. Besides, the polyethylene resin composition according to the present embodiment, since containing an ethylene homopolymer, has a high melting point and in its turn becomes a resin composition excellent in the heat resistance. The polyethylene resin composition is preferably a composition composed of an ethylene homopolymer particularly from the viewpoint of the processability, the air permeation, the heat resistance and the mechanical strength.

[Melt Flow Rate (MFR)]

MFR of the polyethylene resin composition is 0.10 g/10 min or more and 0.60 g/10 min or less, preferably 0.15 g/10 min or more and 0.50 g/10 min or less, and more preferably 0.20 g/10 min or more and 0.40 g/10 min or less. When MFR of the polyethylene resin composition is 0.10 g/10 min or more, the resin pressure and torque in a granulation step and in a film-formation step of a microporous film are low leading to a good processability. In addition, when MFR of the polyethylene resin composition is 0.60 g/10 min or less, the piercing strength of the obtained microporous film is further improved. Here, MFR can be measured by a method described in Examples. MFR of the polyethylene resin composition can be regulated by regulating the degree of polymerization of an ethylene homopolymer to be used, or by using two or more ethylene homopolymers having different MFRS.

[Molecular Weight Distribution (Mw/Mn)]

The molecular weight distribution (Mw/Mn) of the polyethylene resin composition is 6.0 or more and 20 or less, preferably 6.5 or more and 19 or less, and more preferably 7.0 or more and 18 or less. When the molecular weight distribution (Mw/Mn) of the polyethylene resin composition is 6.0 or more, the resin pressure and torque in a granulation step and in a film-formation step of a microporous film are low leading to a tendency of a good processability. In addition, when the molecular weight distribution (Mw/Mn) of the polyethylene resin composition is 20 or less, the piercing strength of the obtained microporous film is likely to be improved. The molecular weight distribution can be measured by a method described in Examples. The molecular weight distribution of the polyethylene resin composition can be regulated by regulating the degree of polymerization of an ethylene homopolymer to be used, or by using two or more ethylene homopolymers having different molecular weights.

[Density of the Polyethylene Resin Composition]

The density of the polyethylene resin composition is 956 kg/m$^3$ or more and 970 kg/m$^3$ or less, preferably 957 kg/m$^3$ or more and 969 kg/m$^3$ or less, and more preferably 958 kg/m$^3$ or more and 968 kg/m$^3$ or less. When the density of the polyethylene resin composition is 956 kg/m$^3$ or more, the heat resistance is good. In addition, when the density of the polyethylene resin composition is 970 kg/m$^3$ or less, the piercing strength of the obtained microporous film is good and excellent. The density can be measured by a method described in Examples. The density of the polyethylene resin composition can be regulated by regulating the manufacturing conditions for an ethylene homopolymer, or by using two or more ethylene homopolymers having different densities.

[Cumulative Elution Volume of 40° C. or More and Less than 91° C. in a CFC Measurement]

The cumulative elution volume (hereinafter, also referred to as "S1") of 40° C. or more and less than 91° C. in a CFC measurement of the polyethylene resin composition according to the present embodiment is 2.0% by mass or more and 15% by mass or less, preferably 2.5% by mass or more and 14.5% by mass or less, and more preferably 3.0% by mass or more and 14% by mass or less of the total elution volume. When the cumulative elution volume of 40° C. or more and less than 91° C. is 2.0% by mass or more of the total elution volume, cracks are easily generated in a cold stretching step when a microporous film is obtained. Thereby, sufficient pore-opening properties can be obtained in a heat stretching step thereafter, and thus the air permeability of the obtained microporous film increases. It is preferable also from the viewpoint of the processability that the cumulative elution volume of 40° C. or more and less than 91° C. is 2.0% by mass or more of the total elution volume. When the cumulative elution volume of 40° C. or more and less than 91° C. is 15% by mass or less of the total elution volume, the piercing strength of the obtained microporous film is good, which makes the polyethylene resin composition preferable. It is preferable also from the viewpoint of heat resistance properties that the cumulative elution volume of 40° C. or more and less than 91° C. is 15% by mass or less of the total elution volume.

[Cumulative Elution Volume of 91° C. or More and Less than 100° C. in the CFC Measurement]

The cumulative elution volume (hereinafter, also referred to as "S2") of 91° C. or more and less than 100° C. in the CFC measurement of the polyethylene resin composition according to the present embodiment is 40% by mass or more and 60% by mass or less, preferably 42% by mass or more and 59% by mass or less, and more preferably 44% by mass or more and 58% by mass or less of the total elution volume. When the cumulative elution volume of 91° C. or more and less than 100° C. is 40% by mass or more of the total elution volume, cracks are easily generated in a cold stretching step when a microporous film is obtained. Thereby, sufficient pore-opening properties can be obtained in a heat stretching step thereafter, and thus the air permeability of the obtained microporous film increases. It is preferable also from the viewpoint of the processability that the cumulative elution volume of 91° C. or more and less than 100° C. is 40% by mass or more of the total elution volume. When the cumulative elution volume of 91° C. or more and less than 100° C. is 60% by mass or less of the total elution volume, the piercing strength of the obtained microporous film is good. It is preferable also from the viewpoint of heat resistance properties that the cumulative elution volume of 91° C. or more and less than 100° C. is 60% by mass or less of the total elution volume.

[Cumulative Elution Volume of 100° C. or More and Less than 105° C. in the CFC Measurement]

The cumulative elution volume (hereinafter, also referred to as "S3") of 100° C. or more and less than 105° C. in the CFC measurement of the polyethylene resin composition according to the present embodiment is 30% by mass or more and 55% by mass or less, preferably 31% by mass or more and 53% by mass or less, and more preferably 32% by mass or more and 51% by mass or less of the total elution volume. When the cumulative elution volume of 100° C. or more and less than 105° C. is 30% by mass or more of the total elution volume, the piercing strength of the obtained microporous film is good. It is preferable also from the viewpoint of heat resistance properties that the cumulative elution volume of 100° C. or more and less than 105° C. is 30% by mass or more of the total elution volume. When the cumulative elution volume of 100° C. or more and less than 105° C. is 55% by mass or less of the total elution volume, the processability is good, which makes the polyethylene resin composition preferable.

[Cumulative Elution Volume of 105° C. or More and Less than 120° C. in the CFC Measurement]

The cumulative elution volume (hereinafter, also referred to as "S4") of 105° C. or more and less than 120° C. in the CFC measurement of the polyethylene resin composition according to the present embodiment is 5.0% by mass or less, preferably 4.5% by mass or less, and more preferably 4.0% by mass or less of the total elution volume. When the cumulative elution volume of 105° C. or more and less than 120° C. is 5.0% by mass or less of the total elution volume, since entanglements of molecular chains become few, cracks are easily generated in a cold stretching step when a microporous film is obtained. Thereby, sufficient pore-opening properties can be obtained in a heat stretching step thereafter, and thus the air permeability of the obtained microporous film increases. The lower limit value of the cumulative elution volume of 105° C. or more and less than 120° C. is not especially limited, but is 0% by mass, that is, it is most preferable that substantially no S4 exist.

Here, the "cross-fractionation chromatography (CFC)" is an apparatus in a combination of a temperature-rise elution fractionation section (hereinafter, also referred to as "TREF section") carrying out crystalline fractionation and a GPC section carrying out molecular weight fractionation, and is the apparatus capable of analyzing the interrelationship between the composition distribution and the molecular weight distribution by directly connecting the TREF section and the GPC section. In the present embodiment, the measurement by the TREF section will be described as CFC measurement.

CFC measurement is carried out as follows based on a principle described in "Journal of Applied Polymer Science, vol. 26, 4217-4231 (1981)". A polyethylene resin composition as a measurement object is completely dissolved in orthodichlorobenzene. Thereafter, the solution is cooled in a certain temperature program to thereby form a thin polymer layer on an inactive carrier surface. At this time, components having higher crystallinity are first crystallized, and along with the temperature fall, components having lower crystallinity are then crystallized. Then, when the temperature is stepwise raised, components are eluted in order from those having lower crystallinity to those having higher crystallinity, whereby the concentration of an elution component at a predetermined temperature can be detected. The elution volumes S1 to S4 in the present embodiment indicate amounts of ethylene polymers eluted in each temperature range in the above temperature-rise time.

The elution volume and the cumulative elution volume at each temperature of an ethylene polymer can be determined by measuring an elution temperature-elution volume curve in TREF section as follows. FIG. 1 shows a temperature profile of a column. Specifically, first, a column containing a filler is heated to 140° C.; and a sample solution (for example, concentration: 20 mg/20 mL) in which a polyethylene resin composition is dissolved in orthodichlorobenzene is introduced, and held for 120 min. Then, the column is cooled at a temperature-fall rate of 0.5° C./min to 40° C., and then held for 20 min to thereby make the sample deposit on the surface of the filler. Thereafter, the temperature of the column is successively raised at a temperature-rise rate of 20° C./min. The temperature of 40° C. or more and less than 60° C. is raised at 10° C. intervals; the temperature from 60° C. to 75° C. is raised at 5° C. intervals; the temperature from 75° C. to 90° C. is raised at 3° C. intervals; the temperature from 90° C. to 110° C. is raised at 1° C. intervals; and the temperature from 110° C. to 120° C. is raised at 5° C. intervals. The temperature is raised after being held at the each temperature for 21 min, and the concentration of the component eluted at the each temperature is detected. Then, an elution temperature-elution volume curve (FIG. 2) is fabricated from values of elution volumes (% by mass) of the components and in-column temperatures (° C.) at this time to thereby acquire an elution volume and a cumulative elution volume at the each temperature. More specifically, the measurement can be carried out by a method described in Examples.

In the polyethylene resin composition according to the present embodiment, it is preferable that two or more elution peaks as measured by CFC be present. Respective volumes of elution components S1 to S4 in a CFC measurement depend on the degrees of crystallinity of the sample, and the crystallinity degree distribution can be evaluated using the volumes. S1 exhibits a lower degree of crystallinity than S2 to S4, and the degree of crystallinity tends to become higher according as the cumulative elution volume goes from S2 to S3 to S4. In manufacture of a microporous film by a stretching method, a microporous structure is formed by causing crystal interfaces to exfoliate and fabricating gap portions between lamellae by low-temperature stretching and successively high-temperature stretching. Therefore, controlling the S1 to S4 elution volumes in the above proportions enables forming a microporous film having a homogeneous pore distribution, makes the air permeability of the obtained microporous film to be good, and further allows giving the excellent strength and heat resistance.

In the polyethylene resin composition according to the present embodiment, even after being processed into a microporous film described later, the MRF, the molecular weight distribution, the density and the elution behavior in CFC measurement do not vary. Therefore, by taking out separators from batteries and the like as products, and analyzing the separators by a method described in the present specification, whether or not the separators fall under the polyethylene resin composition according to the present embodiment can be determined.

Means to regulate the elution volumes of S1 to S4 components in the above ranges include increasing the purity of ethylene gas in the polymerization, using a solvent having little unsaturated compounds and a high purity, making the residence time in the polymerization as short as possible, separating an ethylene homopolymer and a solvent by a centrifugal separation method, and making the solvent amount contained in the ethylene homopolymer before drying to be 70% by mass or less with respect to the weight of the ethylene homopolymer, and carrying out the inactivation of a catalyst after a solvent is separated as much as possible by a centrifugal separation method.

Further, the most effective means to regulate the elution volumes of S1 to S4 components in the above ranges is that a component (A) described below is contained in a proportion of 30% by mass to 70% by mass, and a component (B) described below is contained in a proportion of 30% by mass to 70% by mass.

Hereinafter, the component (A) and the component (B) which may be contained in the polyethylene resin composition will be described.

[Component (A)]

The component (A) is composed of an ethylene homopolymer having a MFR of 3.0 g/10 min or more and 300 g/10 min or less and a density of 962 kg/m$^3$ or more and 974 kg/m$^3$ or less. MFR of the component (A) is preferably 4.0 g/10 min or more and 200 g/10 min or less, and more preferably 4.5 g/10 min or more and 100 g/10 min or less. When MFR is 3.0 g/10 min or more, cracks are easily generated in a cold stretching step when a microporous film is obtained. Thereby, sufficient pore-opening properties can be obtained in a heat stretching step thereafter, and thus the air permeability of a microporous film is likely to become higher. On the other hand, when MFR is 300 g/10 min or less, the piercing strength of a microporous film is likely to be good.

The density of the component (A) is 962 kg/m$^3$ or more and 974 kg/m$^3$ or less, preferably 963 kg/m$^3$ or more and 973 kg/m$^3$ or less, and more preferably 964 kg/m$^3$ or more and 972 kg/m$^3$ or less. The density may be varied depending on MFR of the component (A). When the density of the component (A) is 962 kg/m$^3$ or more, the air permeability of a microporous film is likely to be good and excellent. In addition, when the density of the component (A) is 974 kg/m$^3$ or less, the piercing strength of a microporous film is likely to be good. Here, the density can be measured by a method described in Examples.

Further when the component (A) is an ethylene homopolymer, entanglements of molecular chains are few, and cracks are likely to be easily generated in a cold stretching step when a microporous film is obtained. Thereby, sufficient pore-opening properties can be provided in stretching in a heat stretching step thereafter.

The content of the component (A) is, with respect to 100% by mass of the polyethylene resin composition, 30% by mass or more and 70% by mass or less, preferably 35% by mass or more and 65% by mass or less, and more preferably 40% by mass or more and 60% by mass or less. When the content of the component (A) is 30% by mass or more, cracks are easily generated in a cold stretching step when a microporous film is obtained. Thereby, sufficient pore-opening properties can be obtained in a heat stretching step thereafter, and thus the air permeability of a microporous film is likely to become higher. On the other hand, when the content of the component (A) is 70% by mass or less, the piercing strength of a microporous film is likely to be good.

[Component (B)]

The component (B) is composed of an ethylene homopolymer having a MFR different from that of the component (A). MFR of the component (B) is preferably 0.00030 g/10 min or more and 0.30 g/10 min or less, more preferably 0.0010 g/10 min or more and 0.10 g/10 min or less, and still more preferably 0.0020 g/10 min or more and 0.030 g/10 min or less. When MFR is 0.00030 g/10 min or more, the piercing strength is likely to be better. On the other hand, when MFR is 0.30 g/10 min or less, the processability is likely to be better.

When production of a polyethylene resin composition is carried out by a multistage polymerization method described later, MFR of the component (B) contained in the obtained polymer (also referred to as "multistage polymer") can be calculated by Expression 1 described in Examples.

When the component (B) is produced independently from the component (A), MFR of the component (B) can be measured according to JIS K7210:1999 ("A" method, code D, temperature: 190° C., load: 2.16 kg), and can also be determined by the following Expression 1.

$$\mathrm{Log}_{10}\mathrm{MFR}_B = (100/W_B \times \mathrm{Log}_{10}\mathrm{MFR}_C) - (W_A/W_B \times \mathrm{Log}_{10}\mathrm{MFR}_A)$$ Expression 1

Here, $\mathrm{MFR}_A$ denotes a MFR value of a component (A); $\mathrm{MFR}_B$, a MFR value of a component (B); $\mathrm{MFR}_C$, a MFR value of a polyethylene resin composition; $W_A$, a % by mass of the component (A) with respect to 100% by mass of the polyethylene resin composition; and $W_B$, a % by mass of the component (B) with respect to 100% by mass of the polyethylene resin composition.

When the component (B) is an ethylene homopolymer having few entanglements of molecular chains, cracks are likely to be easily generated in a cold stretching step when a microporous film is obtained. Thereby, sufficient pore-opening properties can be obtained in a heat stretching step thereafter, and thus the air permeability of a microporous film becomes higher.

The content of the component (B) is 30% by mass or more and 70% by mass or less, preferably 35% by mass or more and 65% by mass or less, and more preferably 40% by mass or more and 60% by mass or less. When the content of the component (B) is 30% by mass or more, the piercing strength of a microporous film is likely to be improved. In addition, when the content of the component (B) is 70% by mass or less, cracks are easily generated in a cold stretching step when a microporous film is obtained. Thereby, sufficient pore-opening properties can be obtained in a heat stretching step thereafter, and thus the air permeability of a microporous film is likely to become higher.

The component (B), after an ethylene homopolymer as the component (A) is produced in at least one polymerization vessel, may be a multistage polymer produced in the multistage polymerization apparatus in the presence of the component (A). Alternatively, the component (B) may be produced independently from the component (A). Among these, the component (B) preferably contains a multistage polymer because the component (A) and the component (B) are homogeneously dispersed and pore-opening properties of a microporous film are made more homogeneous.

[Content of Components Having a Molecular Weight of 1,000,000 or More]

The content of components having a molecular weight in terms of polyethylene of 1,000,000 or more in the polyethylene resin composition according to the present embodiment is preferably 5.0% by mass or less, more preferably 4.7% by mass or less, and still more preferably 4.5% by mass or less. Further the content of the components having a molecular weight of 1,000,000 or more is preferably 0.010% by mass or more, and more preferably 0.10% by mass or more. When the content of components having a molecular weight of 1,000,000 or more is 5.0% by mass or less, entanglements of molecular chains are few, and cracks are likely to be easily generated in a cold stretching step when a microporous film is obtained. Thereby, sufficient pore-opening properties can be obtained in a heat stretching step thereafter, and thus the air permeability of a microporous film increases. In addition, when the content of the components having a molecular weight of 1,000,000 or more is 0.010% by mass or more, the piercing strength is likely to be better.

[Polymerization Catalyst for an Ethylene Homopolymer]

An ethylene homopolymer contained in the polyethylene resin composition according to the present embodiment is preferably one obtained by using a Ziegler-Natta catalyst or a metallocene catalyst. The Ziegler-Natta catalyst suitably usable is one described in Japanese Patent Laid-Open No. 2003-246814. The metallocene catalyst suitably usable is one described in Japanese Patent Laid-Open No. 2006-273977.

[Methods for Producing the Polyethylene Resin Composition]

The polyethylene resin composition according to the present embodiment may be obtained by each independently producing the component (A) and the component (B) described before and mixing these. Alternatively, the component (A) and the component (B) may be produced in the same batch using a multistage polymerization apparatus. Polymerization methods will be described hereinafter.

Polymerization methods in a production method of the polyethylene resin composition according to the present embodiment are not especially limited, but include, for example, a method in which a monomer containing ethylene is polymerized using a suspension polymerization method or a gas-phase polymerization method. Among these, a suspension polymerization method in which the polymerization heat can efficiently be removed is preferable.

A polymerization apparatus to be suitably used is a multistage polymerization apparatus, for example, described in Japanese Patent Publication No. 35-15246, in which a plurality of polymerization vessels are connected in series.

The polymerization temperature in the production method of the polyethylene resin composition is usually 30° C. or more and 150° C. or less, preferably 50° C. or more and 120° C. or less, and more preferably 70° C. or more and 100° C. or less. When the polymerization temperature is 30° C. or more, the industrially efficient production is likely to be allowed. On the other hand, when the polymerization temperature is 100° C. or less, the continuous stable operation is likely to be allowed.

In production methods of ethylene, it is known, for example, as described in German Patent Publication No. 3127133 that the molecular weight and the like can be regulated by making hydrogen to be present in the polymerization system, or varying the polymerization temperature. In order to obtain the polyethylene resin composition according to the present embodiment, however, the polymerization condition is controlled preferably as follows.

In the present embodiment, in order to make MFR of the component (A) to be 3.0 to 300 g/min and the density to be 962 to 974 kg/m³, it is preferable in the case of using a Ziegler catalyst that the polymerization temperature be made to be 70 to 100° C., and the molar ratio of hydrogen/(ethylene+hydrogen) be made to be 10% by mol or more and 60% by mol or less. It is preferable in the case of using a metallocene catalyst that the polymerization temperature be made to be 50 to 80° C., and the molar ratio of hydrogen/(ethylene+hydrogen) be made to be 0.15% by mol or more and 0.5% by mol or less.

In order to make MFR of the polyethylene resin composition to be 0.10 to 0.60 g/min, the molecular weight distribution to be 6.0 to 20 and the density to be 956 to 970 kg/m³, and the above elution behavior in a cross-fractionation chromatography to be exhibited, it is preferable in production of the component (B) that a Ziegler catalyst be used; the polymerization temperature be made to be 70° C. to 100° C.; and the molar ratio of hydrogen/(ethylene+hydrogen) be made to be 3% by mol or more and 15% by mol or less. It is preferable in the case of using a metallocene catalyst in production of the component (B) that the polymerization temperature be made to be 60° C. to 90° C., and the molar ratio of hydrogen/(ethylene+hydrogen) be made to be 0.03% by mol or more and 0.1% by mol or less.

Since if the polymerization temperature is raised, MFR is likely to be raised, the molar ratio of hydrogen/(ethylene+hydrogen) is adjusted in the direction of reducing the molar ratio. Further since if the polymerization pressure is raised, MFR is likely to be lowered, the molar ratio of hydrogen/(ethylene+hydrogen) is adjusted in the direction of increasing the molar ratio.

In a suspension polymerization method, an inactive hydrocarbon solvent can be used as a medium, and an olefin itself may be used as a solvent. The inactive hydrocarbon solvent is not especially limited, but specifically includes aliphatic hydrocarbons such as propane, butane, isobutane, pentane, isopentane, hexane, heptane, octane, decane, dodecane and kerosene; alicyclic hydrocarbons such as cyclopentane, cyclohexane and methylcyclopentane; aromatic hydrocarbons such as benzene, toluene and xylene; halogenated hydrocarbons such as ethyl chloride, chlorobenzene and dichloromethane; and mixtures thereof.

The polymerization pressure in the production method of the polyethylene resin composition is usually normal pressure or more and 2 MPa or less, preferably 0.10 MPa or more and 1.5 MPa or less, and more preferably 0.12 MPa or more and 1.0 MPa or less. When the polymerization pressure is normal pressure or more, the polymerization reaction can be carried out by any method of a batch type, a semi-continuous type and a continuous type.

In the present embodiment, in a method of polymerizing ethylene by a multistage polymerization apparatus, an ethylene homopolymer as a component (A) is produced, and an ethylene homopolymer as a component (B) is produced in the presence of the component (A) in at least one polymerization vessel. Here, MFR of the component (B) can be calculated by Expression 2 described in Examples described later.

A polymerization vessel used for the polymerization of an ethylene homopolymer as the component (A) is not especially limited, but examples thereof include a first-stage polymerization vessel, an intermediate polymerization vessel, a final-stage polymerization vessel and a two- or more multistage polymerization vessel. Among these, the first-stage polymerization vessel and the intermediate polymerization vessel are preferable. A polymerization vessel used for the polymerization of the component (B) is not especially limited, but examples thereof include a first-stage polymerization vessel, an intermediate polymerization vessel, a final-stage polymerization vessel and a two- or more multistage polymerization vessel. Among these, the intermediate polymerization vessel and the final-stage polymerization vessel are preferable.

[Granulation Step of the Polyethylene Resin Composition]

The polyethylene resin composition obtained as in the above may be pelletized. Specifically, a granulation step involves feeding the polyethylene resin composition to an extruder and melting and kneading the polyethylene resin composition at a temperature of 160° C. to 280° C., preferably 180° C. to 260° C., to thereby obtain pellets of the polyethylene resin composition.

[Microporous Film]

A microporous film according to the present embodiment contains the polyethylene resin composition. The use of the above polyethylene resin composition enables providing a microporous film excellent in the air permeation, the heat resistance and the mechanical strength.

The microporous film is preferably one obtained by a stretching pore-opening method. Since such a microporous film can be manufactured without using a solvent or the like, the method is likely to be low in the environmental load and to further improve the productivity.

[Manufacture Method of a Microporous Film]

Figure 2:
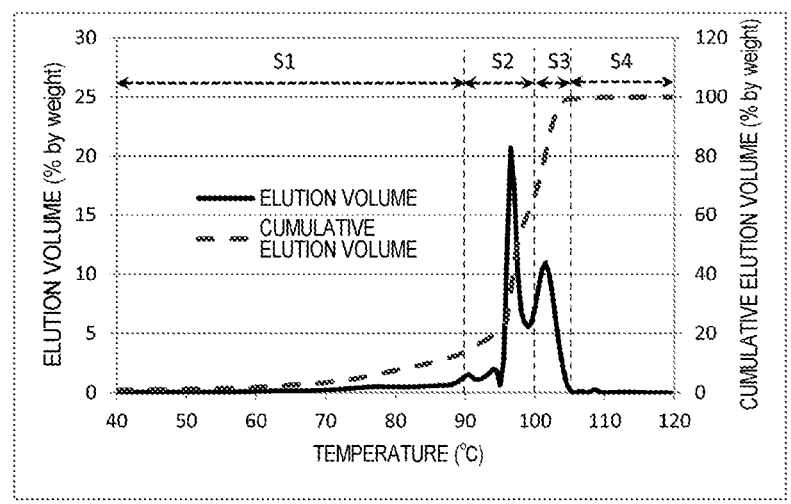
FIG. 2 is an elution temperature-elution volume curve acquired by a CFC measurement.

A manufacture method of a microporous film is not especially limited, but includes a "stretching pore-opening method" and a "phase separation method" described, for example, in "Processing and Forming of a Separator for an Ion Secondary Battery" ("Seikei-Kakou, vol. 11", 1999, Hiroshi Tanji, published by The Japan Society of Polymer Processing, p. 762, FIG. 2, a method for manufacturing a separator for a LIB, and a micro structure)(in Japanese).

The manufacture method of the microporous film according to the present embodiment preferably comprises a step of opening pores in the polyethylene resin composition by a stretching pore-opening method. Thereby, the method dispenses with use of a solvent, an inorganic filler and the like, and thus the processability is likely to become high.

The stretching pore-opening method is a method in which a polymer formed into a film-shape, as required, is subjected to a heat treatment to thereby form a highly regular crystal structure therein, and stretched to exfoliate crystal interfaces and fabricate gap portions between lamellae to thereby form a microporous structure. Since the method is a process in which the stretching itself is the governing principle to form pores, the crystal structure before stretching is important.

The manufacture method of the microporous film according to the present embodiment preferably comprises a step of forming a raw film, and further a stretching step.

(Step of Forming a Raw Film)

A raw film according to the present embodiment can be fabricated by a sheet-forming method such as T-die extrusion, inflation forming, calender forming and a skive method. Particularly from the viewpoint of physical properties and applications demanded on the microporous film according to the present embodiment, inflation forming and T-die extrusion are preferable.

(Stretching Step)

The stretching step is not especially limited, but preferably comprises each step of, for example, a cold stretching step (a) of stretching a film composed of the polyethylene resin composition at a temperature of −20° C. or more and lower than 100° C., and a heat stretching step (b), after the cold stretching step, of stretching the polyethylene resin composition at a temperature of 100° C. or more and lower than 135° C.

In the stretching step, a method of stretching in the uniaxial direction and/or biaxial direction by using a roll, a tenter, an Autograph or the like can be employed. Particularly from the viewpoint of physical properties and applications demanded on the microporous film obtained in the present embodiment, uniaxial stretching in two- or more stages using a roll is preferable. When uniaxial stretching is carried out in the cold stretching step (a) and the heat stretching step (b), the stretching direction is not limited, but the same direction is preferable, and the direction is preferably the extrusion direction (hereinafter, referred to as "MD direction").

The manufacture method of the microporous film according to the present embodiment will be described specifically hereinafter.

(Manufacture of the Microporous Film)

First, the pellets of the polyethylene resin composition are fed to an inflation forming apparatus, and formed into a film-shape at a temperature of 150° C. to 280° C., preferably 170° C. to 250° C.

The draw ratio after the extrusion into a film-shape as described above, that is, a value of a take-up speed (unit: m/min) of the film divided by an extrusion speed (a linear speed in the flow direction of a melt resin passing through a die lip, unit: m/min) of the polyethylene resin composition, is preferably 10 to 500, more preferably 50 to 400, and still more preferably 100 to 300.

The take-up speed of the film is preferably about 2 to 400 m/min, and more preferably 4 to 200 m/min. Making the draw ratio in the above range is suitable from the viewpoint of improving the air permeation of the microporous film as the target.

(Heat Treatment Step)

The polyethylene resin composition film manufactured as described above, as required, is preferably subjected to a heat treatment (annealing). The annealing method is not especially limited, but examples thereof include a method of bringing the film into contact on a heating roll, a method of exposing the film in a heated gas phase before the take-up, a method of taking up the film on a core and exposing the film in a heated gas phase or a heated liquid phase, and a method of being carried out by combining these.

The annealing condition is not especially limited, but preferably involves annealing, for example, at a heating temperature of 100° C. to 130° C. for 10 sec to 100 hours. When the heating temperature is 100° C. or more, the air permeation of the microporous film as the target becomes better. In addition, when the heating temperature is 130° C. or less, the film is hardly mutually fused even if the film is annealed in the taken-up state on the core. A more preferable range of the heating temperature is 110° C. to 130° C.

(Cold Stretching Step)

Then, a cold stretching step will be described. The film, after being subjected to the heat treatment as described above, is cold-stretched by 1.05 times to 2.0 times at least in one direction. The stretching temperature in the cold stretching step is preferably −20° C. or more and lower than 100° C., and more preferably 0° C. or more and 50° C. or less. Stretching the film at −20° C. or more is likely to make it easy for cracks to be generated in the microporous film. In addition, stretching the film at lower than 100° C. is likely to make the air permeation of the obtained microporous film to become better. Here, the stretching temperature is the surface temperature of the film in the cold stretching step.

The stretch ratio of cold stretching in the cold stretching step is preferably 1.05 times or more and 2.0 times or less, and more preferably 1.2 times or more and 1.7 times or less. When the stretch ratio in the cold stretching step is 1.05 times or more, a microporous film having a good air permeation is likely to be provided. In addition, when the stretch ratio in the cold stretching step is 2.0 times or less, a microporous film having a uniform thickness is likely to be provided.

The cold stretching of the microporous film is carried out at least in one direction, and may be carried out in two directions, but is preferably carried out uniaxially only in the extrusion direction of the film.

In the present embodiment, in the cold stretching step, it is preferable that the microporous film be stretched at a temperature of 0° C. or more and 50° C. or less by 1.1 times to 2.0 times uniaxially in MD direction.

(Heat Stretching Step)

Then, the heat stretching step will be described. After the film is cold-stretched as described above, the film is heat-stretched by 1.05 times or more and 5.0 times or less at least in one direction. The stretching temperature of the heat stretching is preferably 100° C. or more and 130° C. or less, and more preferably 110° C. or more and 125° C. or less. Heat stretching at 100° C. or more makes pores to be easily opened in the film; and heat stretching at 130° C. or less makes the air permeation of the microporous film as the target to become good. Here, the stretching temperature of heat stretching refers to the surface temperature of the film in the heat stretching step.

The stretch ratio of heat stretching in the heat stretching step is preferably 1.05 times or more and 5.0 times or less, more preferably 1.1 times or more and 4.5 times or less, and still more preferably 1.5 times or more and 4.0 times or less. When the stretch ratio in the heat stretching step is 1.05 times or more, a microporous film having a good air permeation is likely to be provided. In addition, when the stretch ratio in the heat stretching step is 5.0 times or less, a microporous film having a uniform thickness is likely to be provided.

The heat stretching is carried out at least in one direction, and may be carried out in two directions, but is preferably carried out in the same direction as in the stretching direction of the cold stretching, more preferably carried out uniaxially only in the same direction as in the stretching direction of the cold stretching.

In the present embodiment, in the heat stretching step, it is preferable that the film cold-stretched through the cold stretching step be stretched at a temperature of 100° C. or more and 130° C. or less by 1.5 times to 5.0 times uniaxially in MD direction.

The manufacture method of the microporous film according to the present embodiment may further carry out an optional stretching step in addition to the above-mentioned stretching steps.

(Heat Fixation Step)

The manufacture method of the microporous film according to the present embodiment preferably comprises a heat fixation step of carrying out heat fixation preferably at 110° C. or more and 135° C. or less on the film obtained through the heat stretching step. A method of the heat fixation includes a method (hereinafter, this method is referred to as "relaxation") in which the length of the film after the heat fixation has been thermally shrunk in such a degree that the length is reduced by 3 to 50% with respect to the length of the microporous film before the heat fixation, and a method of heat-fixing so that the dimension in the stretching direction does not change.

The heat fixation temperature is preferably 110° C. or more and 135° C. or less, and more preferably 115° C. or more and 130° C. or less. Here, the heat fixation temperature refers to the surface temperature of the microporous film in the heat fixation step.

As described above, the microporous film as the target can be obtained through the manufacture step of the film composed of the polyethylene resin composition, and as required, the heat treatment step, thereafter, the cold stretching step and the heat stretching step, and further as required, through the heat fixation step.

(Surface Treatment Step)

In the present embodiment, for the purpose of improving the affinity of the microporous film for a coating agent or a solvent, a hydrophilization treatment may be carried out on the film preferably after having been subjected to the heat fixation step by using a well-known technology using a corona discharge processor, a plasma processor, an ozone processor, a flame processor or the like.

(Coating Step)

In the present embodiment, coating may be carried out on at least one surface of the microporous film preferably having been subjected to the above hydrophilization treatment. For example, a heat-resistant porous layer constituted of an inorganic filler (microparticle) and a binder can be provided on one surface of the microporous film. In this case, the binder is used for the purpose of binding mutually the inorganic filler, and binding the inorganic filler and the surface of the microporous film.

A well-known technology can be used for forming the heat-resistant porous layer. The heat-resistant porous layer can be formed, for example, by a method disclosed in Japanese Patent Laid-Open No. 2011-832; a heat-resistant microporous film obtained using this is excellent in the heat resistance, and can further improve the safety and the reliability of a secondary battery.

(Lamination Step)

The microporous film according to the present embodiment may be a single-layer film or a laminated film. The laminated film may be made as a laminated film having one or more layers of the microporous film according to the present embodiment, or a laminated film every layer of which is the microporous film according to the present embodiment. A manufacture method of the laminated film is not especially limited, but the laminated film can be manufactured, for example, by laminating by a lamination process, or by a step of laminated extrusion. Further, the laminated film may be composed of layers of the same materials or layers of different materials.

[Blend of Additives]

The polyethylene resin composition or the microporous film according to the present embodiment, as required, may contain well-known additives such as an antioxidant, metal soaps such as calcium stearate and zinc stearate, an ultraviolet absorbent, a light stabilizer, an antistatic agent, an antifogging agent and a coloring pigment.

The antioxidant is preferably phenol-based antioxidants being primary antioxidants, and is not especially limited, but examples thereof include 2,6-di-t-butyl-4-methylphenol, pentaerythrityl-tetrakis-[3-(3,5-di-t-butyl-4-hydroxyphenyl) propionate] and octadecyl-3-(3,5-di-t-butyl-4-hydroxyphenyl) propionate. A secondary antioxidant may be concurrently used, and includes phosphorus-based antioxidants such as tris(2,4-di-t-butylphenyl) phosphite and tetrakis(2,4-di-t-butylphenyl)-4,4-biphenylene-diphosphonite. Further, a phosphorus/phenol-based antioxidant includes 6-tert-butyl-4-[3-(2,4,8,10-tetra-t-butyldibenzo-[d,f][1,3,2]dioxaphosphepin-6-yloxy)propyl]-o-cresol. A sulfur-based antioxidant includes dilauryl-thio-dipropionate.

[Separator for a Battery]

A separator for a battery according to the present embodiment has the above microporous film. The separator can become a separator for a battery excellent in the air permeation and the mechanical strengths such as the piercing strength by having the above microporous film.

EXAMPLES

Hereinafter, the present invention will be described by way of Examples and Comparative Examples, but the present invention is not limited to the following.

Catalysts, formation methods of films, fabrication methods of microporous films and evaluation methods of the films used in Examples and Comparative Examples will be described.

[Preparation Method of a Ziegler Catalyst Z1]

2,740 mL of a 2-mol/L n-heptane solution of trichlorosilane ($HSiCl_3$) was charged in a 15-L reactor whose atmosphere was sufficiently replaced by nitrogen, and held at 50° C. under stirring; and 7 L (5 mol in terms of magnesium) of a n-heptane solution of an organomagnesium component represented by a composition formula: $AlMg_6(C_2H_5)_3$ $(n-C_4H_9)_{10.8}(On-C_4H_9)_{1.2}$ was added over 3 hours, and further allowed to react at 50° C. for 1 hour under stirring. After the termination of the reaction, a supernatant liquid was removed from the reaction liquid containing a solid; the obtained solid was 4 times washed with 7 L of n-hexane to thereby obtain a slurry. The solid was separated, dried and analyzed; and the result of the analysis was such that the solid contained, per 1 g thereof, 8.62 mmol of Mg, 17.1 mmol of Cl and 0.84 mmol of a n-butoxy group ($On-C_4H_9$).

The slurry obtained as in the above and containing 500 g of the solid and together 1,250 mL of a 1-mol/L n-hexane solution of n-butyl alcohol were allowed to react at 50° C. for 1 hour under stirring. After the termination of the reaction, a supernatant was removed from the reaction liquid containing a solid; and the obtained solid was once washed with 7 L of n-hexane to thereby obtain a slurry. The slurry was held at 50° C.; and 500 mL of a 1-mol/L n-hexane solution of diethylaluminum chloride was added under stirring and allowed to react for 1 hour. After the termination of the reaction, a supernatant was removed from the reaction liquid containing a solid; and the obtained solid was twice washed with 7 L of n-hexane to thereby obtain a slurry. The slurry was held at 50° C.; and 78 mL of a 1-mol/L n-hexane solution of diethylaluminum chloride and 78 mL of a 1-mol/L n-hexane solution of titanium tetrachloride were added and allowed to react for 1 hour. 234 mL of a 1-mol/L n-hexane solution of diethylaluminum chloride and 234 mL of a 1-mol/L n-hexane solution of titanium tetrachloride were further added to the reaction liquid, and allowed to react for 2 hours. After the termination of the reaction, a supernatant was removed from the reaction liquid containing a solid; and the solid was 4 times washed with 7 L of n-hexane in the state of the internal temperature being held at 50° C., to thereby obtain a solid catalyst component as a hexane slurry solution. The solid catalyst contained 2.8% by mass of titanium.

[Preparation Method of a Ziegler Catalyst Z2]

2,740 mL of a 2-mol/L n-heptane solution of trichlorosilane ($HSiCl_3$) was charged in a 15-L reactor whose atmosphere was sufficiently replaced by nitrogen, and held at 50° C. under stirring; and 7 L (5 mol in terms of magnesium) of a n-heptane solution of an organomagnesium component represented by a composition formula: $AlMg_6(C_2H_5)_3$ $(n-C_4H_9)_{10.8}(On-C_4H_9)_{1.2}$ was added over 3 hours, and further allowed to react at 50° C. for 1 hour under stirring. After the termination of the reaction, a supernatant liquid was removed from the reaction liquid containing a solid; the obtained solid was 4 times washed with 7 L of n-hexane to thereby obtain a slurry. The solid was separated, dried and analyzed; and the result of the analysis was such that the solid contained, per 1 g thereof, 8.62 mmol of Mg, 17.1 mmol of Cl and 0.84 mmol of a n-butoxy group ($On-C_4H_9$).

The slurry obtained as in the above and containing 500 g of the solid and together 1,250 mL of a 1-mol/L n-hexane solution of n-butyl alcohol were allowed to react at 50° C. for 1 hour under stirring. After the termination of the reaction, a supernatant was removed from the reaction liquid containing a solid; and the obtained solid was once washed with 7 L of n-hexane to thereby obtain a slurry. The slurry was held at 50° C.; and 1,750 mL of a 1-mol/L n-hexane solution of diethylaluminum chloride was added under stirring and allowed to react for 1 hour. After the termination of the reaction, a supernatant was removed from the reaction liquid containing a solid; and the obtained solid was twice washed with 7 L of n-hexane to thereby obtain a slurry. The slurry was held at 50° C.; and 310 mL of a 1-mol/L n-hexane solution of diethylaluminum chloride and 310 mL of a 1-mol/L n-hexane solution of titanium tetrachloride were added and allowed to react for 2 hours. After the termination of the reaction, a supernatant was removed from the reaction liquid containing a solid; and the obtained solid was 4 times washed with 7 L of n-hexane in the state of the internal temperature being held at 50° C., to thereby obtain a solid catalyst component as a hexane slurry solution. The solid catalyst contained 3.2% by mass of titanium.

[Preparation Method of a Metallocene Catalyst]

(Measurement of the Saturated Adsorption Amount of a Lewis Acidic Compound on a Precursor of a Carrier [C])

As a precursor of a carrier [C], Silica Q6 (made by Fuji Silicia Chemical, Ltd.) was used. As an activating agent compound (E-1), triethylaluminum (Lewis acidic compound) was used.

Silica Q6 was heat-treated under a nitrogen atmosphere at 400° C. for 5 hours. Silica Q6 after the heat treatment had a specific surface area of 480 m$^2$/g, an average particle diameter of 9.5 μm and an amount of a surface hydroxide group of 1.85 mmol/g. 4 g of the silica after the heat treatment was added to a 0.2-L-volume glass vessel under a nitrogen atmosphere, and 80 mL of hexane was added and the mixture was dispersed to thereby obtain a silica slurry. 10 mL of a hexane solution (concentration: 1 mol/L) of triethylaluminum was added to the obtained slurry at 20° C. under stirring, and thereafter stirred for 2 hours to thereby allow the triethylaluminum to react with surface hydroxide groups of the silica. The aluminum amount in a supernatant in the hexane slurry was quantitatively determined, and the saturated adsorption amount of triethylaluminum on Silica Q6 was resultantly 2.1 mmol/g.

(Preparation Method of the Carrier [C])

Silica Q6 (40 g) after the heat treatment was dispersed in 800 mL of hexane in a 1.8-L-volume autoclave whose atmosphere was replaced by nitrogen to thereby obtain a slurry. While the obtained slurry was held at 20° C. under stirring, 80 mL of a hexane solution (concentration: 1 M) of triethylaluminum was added, and thereafter stirred for 2 hours to thereby prepare 880 mL of a hexane slurry of the carrier [C] having triethylaluminum adsorbed thereon.

(Preparation Method of a Transition Metal Compound Component [D])

As a transition metal compound (D-1), [(N-t-butyramide)(tetramethyl-η$^5$-cyclopentadienyl)dimethylsilane]titanium-1,3-pentadiene (hereinafter, abbreviated to "titanium complex") was used. As an organomagnesium compound (D-2), a composition formula: AlMg$_6$(C$_2$H$_5$)$_3$(C$_4$H$_9$)$_{12}$ (hereinafter, abbreviated to "Mg1") was used. Here, the Mg1 was synthesized by mixing predetermined amounts of triethylaluminum and dibutylmagnesium in hexane at 25° C.

200 mmol of the titanium complex was dissolved in 1,000 mL of Isopar(R) E (made by ExxonMobile Chemicals Co.); 20 mL of a hexane solution (concentration: 1 M) of Mg1 was added; hexane was further added to regulate the titanium complex concentration to 0.1 M to thereby obtain a transition metal compound component [D].

(Preparation Method of an Activating Agent [E])

As an activating compound [E-2], bis(hydrogenated tallow alkyl)methylammonium-tris(pentafluorophenyl) (4-hydroxyphenyl) borate (hereinafter, abbreviated to "borate") was used. As an activating compound [E-3], ethoxydiethylaluminum being an organoaluminum compound was used.

5.7 g of the borate was added to 50 mL of toluene and dissolved to thereby obtain a 100 mM toluene solution of the borate. 5 mL of a hexane solution (concentration: 1 M) of ethoxydiethylaluminum was added to the toluene solution of the borate at 25° C., and hexane was further added to thereby regulate the borate concentration in the toluene solution at 80 mM. Thereafter, the solution was stirred at 25° C. for 1 hour to thereby prepare an activating agent [E].

(Preparation Method of a Metallocene-Carrying Catalyst [A])

50 mL of the activating agent [E] obtained by the above operation was added under stirring at 20° C. to 880 mL of the slurry of the carrier [C] obtained by the above operation, and allowed to continuously react for 10 min. Then, 40 mL of the transition metal compound component [D] obtained by the above operation was added under stirring, and allowed to continuously react for 3 hours to thereby prepare a solid component [A]. At this time, coloration was not recognized in a supernatant liquid of the slurry of the metallocene-carrying catalyst [A].

(Preparation Method of a Liquid Component [B])

As an organomagnesium compound [G], the above Mg1 was used. As a compound [J], methylhydropolysiloxane (its viscosity at 25° C.: 20 centistokes, made by Shin-Etsu Silicone Co., Ltd.) was used.

40 mL of hexane and Mg1 in such an amount that the total amount of Mg and Al became 37.8 mmol were added under stirring in a 200-mL flask; 40 mL of hexane containing 2.27 g (37.8 mmol) of methylhydropolysiloxane was added under stirring at 25° C.; thereafter, the mixture was heated to 80° C., and allowed to react under stirring for 3 hours to thereby prepare a liquid component [B].

[Measurement of the Content of an α-Olefin Unit]

The measurement of the content (% by mol) of a polymerization unit originated from α-olefin in the polyethylene resin composition was carried out according to a method disclosed in G. J. Ray, et al., Macromolecules, 10, 773 (1977), and the content was calculated from an integrated intensity acquired by using the methylene carbon signal observed in a $^{13}$C-NMR spectrum. The detection lower limit value was 0.03% by mol.

Measuring apparatus: ECS-400, made by JEOL Ltd.
Observed nucleus: 13C
Observing frequency: 100.53 MHz
Pulse width: 45° (7.5 μsec)
Pulse program: single pulse dec
PD: 5 sec
Measuring temperature: 130° C.
Number of transients: 30,000 or more
Reference: PE (-eee-) signal, 29.9 ppm
Solvent: orthodichlorobenzene-d4
Sample concentration: 5 to 10% by weight
Dissolution temperature: 130 to 140° C.

[Manufacture Method of a Microporous Film]

A polyethylene resin composition film of 30 μm in thickness was obtained by using an inflation film-manufacturing apparatus (D-50, made by Sumitomo Heavy Industries Modern, Ltd.) (screw diameter: 50 mm, screw: L(extrusion screw length)/D(extrusion screw diameter): 28, die: lip diameter: 100 mm, lip clearance: 5.0 mm), and extruding the polyethylene resin composition at a cylinder temperature of 180° C., a die temperature of 180° C., an extrusion volume of 5.0 kg/h and a blow up ratio of 1.0 while jetting cooling air on 10 mm above the die surface (frost line height: 10 mm) to cool the film and stabilize the film formation.

[Heat Treatment]

The polyethylene resin composition film formed by the inflation forming apparatus was heat-treated (annealed) in a gear oven at 120° C. for 3 hours.

[Cold Stretching]

The polyethylene resin composition film was cut out into 100 mm in width and 200 mm in length (MD direction was the long side), and thereafter, the film was set between chucks at a distance of 100 mm of a tensile tester (RTC-1310A, made by Orientec Co., Ltd.), and cold-stretched by 1.5 times at 23° C. at a tensile speed of 200 mm/min in MD direction of the film.

[Heat Stretching]

An oven heated at 120° C. was set right after the cold stretching was carried out; and the film was heated for 30 sec, and further heat-stretched by 1.7 times at a tensile speed of 300 mm/min in MD direction, and heat-fixed for 60 sec to thereby obtain a microporous film.

Further, microporous films having different porosities were obtained by heat-stretching the film cold-stretched by the same method as in the above by altering the stretch ratio in the heat stretching to each stretch ratio of 2.0 times, 2.3 times and 2.5 times under the same heat stretching condition as in the above.

[Measurement of the Porosity (%)]

A sample of 10 cm×10 cm square was cut out from the polyethylene microporous film, and its volume (cm³) and mass (g) were determined; and the porosity (%) was calculated using the following formula from the volume, the mass and its density (g/cm³).

Porosity (%)=(the volume−the mass/the density of the polyethylene resin composition)/the volume×100

[Measurement of the Air Permeability]

The air permeation resistivity of the microporous film was measured according to JIS P-8117 by using a Gurley densometer (made by Toyo Seiki Seisaku-sho Ltd.). The measured value was converted to per 20 μm in film thickness. The porosities of the microporous films obtained by altering the stretch ratio in the heat stretching in the range of 1.7 times to 2.5 times in the manufacture of the microporous films were further measured; the values of the air permeabilities (in terms of per 20 μm) and the porosities are represented by a function formula, and an air permeability (in terms of per 20 μm in thickness, and 50% in porosity) at which the porosity became 50% was calculated from an approximate curve of the function formula.

Here, the higher the air permeation of the microporous film, the smaller the numerical value of the air permeability.

[Measurement of the Piercing Strength]

A digital force gauge (ZP20N, made by Imada Co., Ltd.) was used. The piercing strength (g) as a maximum piercing load was measured by fixing the microporous film with a sample holder (TKS20N) of 10 mm in diameter of its opening, and carrying out a piercing test on the central part of the fixed microporous film at a piercing speed of 12 mm/min and under the condition of 23° C. and a humidity of 50% by using a needle of 0.5 mm in curvature radius of its tip. The acquired piercing strength was converted to per 20 μm in thickness. The porosities and the piercing strengths of the microporous films obtained by altering the stretch ratio in the heat stretching in the range of 1.7 times to 2.5 times were further measured; and piercing strengths (in terms of per 20 μm in thickness, 50% in porosity) at which the porosities became 50% were calculated from an approximate curve of the piercing strengths (in terms of per 20 μm) and the porosities.

[Measurement of Thickness Variation (TD Direction)]

The microporous film was formed, heat-treated and cold-stretched, thereafter further heat-stretched by 2.0 times in MD direction, and heat-fixed by the above methods, and thereafter allowed to stand still under the environment of 23° C. and a humidity of 50% for 24 hours or more. The thicknesses in TD direction of the microporous film thus obtained were measured at 10 points thereof in 5 mm intervals by using a constant-pressure thickness tester (made by TECLOK Corp., type: PG-02, minimum indication: 0.001 mm); and the difference between the thickness of a point where the thickness was maximum or minimum and the average thickness was evaluated. Small variation in the film thickness indicates that pores were uniformly opened, and the evaluations were made by the following method; and Excellent and Good indicated passing, and Fair and Poor indicated failing.

Excellent: ±2% or less to the average thickness
Good: ±4% or less to the average thickness
Fair: ±6% or less to the average thickness
Poor: more than ±6% to the average thickness

[Measurement of the Melt Flow Rate (MFR)]

MFRs of the polyethylene resin composition and the component (A) were measured according to JIS K7210:1999 ("A" method, code D, temperature: 190° C., load: 2.16 kg).

That of the component (B) was calculated according to the following expression 2.

$$\text{MFR of the component }(B) = ((^{Final}\text{MFR})^{-0.175} - (1-f_B) \times (^{1st}\text{MFR})^{-0.175})/f_B)^{(-1/0.175)}$$ Expression 2

Here, $^{Final}$MFR is a MFR of the polyethylene resin composition composed of the component (A) and the component (B); $f_B$ denotes a content of the component (B) with respect to the polyethylene resin composition; and $^{1st}$MFR denotes a MFR of the component (A).

[Measurement of the Density]

The densities of the component (A) and the polyethylene resin composition were measured according to JIS K7112: 1999 (D method).

[Measurement of the Molecular Weight and the Molecular Weight Distribution]

The ratio (Mw/Mn) of the weight-average molecular weight (Mw) to the number-average molecular weight (Mn) determined from gel permeation chromatography (GPC) was defined as a molecular weight distribution. The GPC measurement was carried out under the following condition. The calibration of the molecular weight was carried out at 12 points in the range of 10,500,000 to 2,060,000 of MW (molecular weight) of standard polystyrenes made by Tosoh Corp.; the molecular weight in terms of polyethylene was worked out by multiplying a MW of each standard polystyrene by a coefficient of 0.43, and a primary calibration straight line was fabricated from a plot of elution times and molecular weights in terms of polyethylene, and the weight-average molecular weight (Mw), the number-average molecular weight (Mn) and the viscosity-average molecular weight (Mv) were determined. A proportion of 1,000,000 or more in molecular weight to the entire was calculated from a molecular weight distribution determined by the GPC measurement.

Apparatus: GPC-IR, made by Polymer Char Co., Ltd.
Detector: IR5, made by Polymer Char Co., Ltd.
Column: UT-807 (one column), made by Showa Denko K.K., and GMHHR-H(S)HT (two columns), made by Tosoh Corp., were connected in series and used.
Moving phase: orthodichlorobenzene Column temperature: 140° C.
Flow volume: 1.0 ml/min
Sample concentration: 16 mg/8 mL
Sample dissolution temperature: 140° C.
Sample dissolution time: 90 min

[CFC Measurement]

For the polyethylene resin composition, an elution temperature-elution volume curve by CFC measurement was measured as follows, and an elution volume and a cumulative elution volume at each temperature were determined. First, a column containing a filler was heated to 140° C.; and a sample solution in which the polyethylene resin composition was dissolved in orthodichlorobenzene was introduced, and held for 120 min. Then, the column was cooled at a temperature-fall rate of 0.5° C./min to 40° C., and thereafter held for 20 min to thereby make the sample deposit on the filler surface.

Thereafter, the column was successively heated at a temperature-rise rate of 20° C./min. First, the temperature of 40° C. or more and less than 60° C. was raised at 10° C. intervals; the temperature from 60° C. to 75° C. was raised at 5° C. intervals; the temperature from 75° C. to 90° C. was raised at 3° C. intervals; the temperature from 90° C. to 110° C. was raised at 1° C. intervals; and the temperature from 110° C. to 120° C. was raised at 5° C. intervals. The temperature was raised after being held at the each temperature for 21 min, and the concentration of the component eluted at the each temperature was detected. Then, an elution temperature-elution volume curve was measured from values of elution volumes (% by mass) of the components and in-column temperatures (° C.) at times concerned to thereby determine an elution volume and a cumulative elution volume at the each temperature. FIG. 1 shows a temperature profile of CFC.

Apparatus: automated 3D Analyzer CFC-2, made by Polymer Char Co., Ltd.

Column: a stainless steel microball column (3/8" o.d×150 mm)

Eluent: o-dichlorobenzene (for high performance liquid chromatography)

Sample solution concentration: (20 mg of a sample (polyethylene resin composition))/(20 mL of o-dichlorobenzene)

Injection volume: 0.5 mL
Pump flow volume: 1.0 mL/min
Detector: an infrared spectrometer IR4, made by Polymer Char Co., Ltd.
Detection wave number: 3.42 μm
Sample dissolution condition: 140° C.×120 min dissolution

[Data Analysis]

A chromatogram of the elution component in the each elution temperature acquired by the CFC measurement was processed by a data processing program attached to an Automated 3D Analyzer CFC-2, made by Polymer Char Co., Ltd. to thereby determine an elution volume (proportional to an area in the chromatogram) so normalized that the sum became 100%.

[Melt Viscosity]

The melt viscosity was measured by using a Capillograph (1C, made by Toyo Seiki Seisaku-sho Ltd.) and a capillary of 0.77 mm in diameter and 50.8 mm in length, under the measurement condition of a measurement temperature of 180° C. and a shear rate of 533 sec$^{-1}$. The unit was Pa·s. The viscosity at a shear rate of 533 sec$^{-1}$ was used as an index of the processability.

[Resin Pressure]

A twin-screw extruder (TEX28V-42CW-4V, made by Japan Steel Works, Ltd., diameter: 28 mm, L/D: 42) and a weight-type twin-screw feeder (TTF20EII, hopper volume: 40 L) were used. When extrusion was carried out at a set temperature of 200° C., with a breaker plate installed with a 40/60/80 mesh, a die head of 4 mm in diameter and 3 holes, at a screw rotation frequency of 100 rpm at a discharge volume of 10 kg/h, a resin pressure was measured by a resin pressure gauge attached behind the breaker plate, and was used as an index of the processability. For the facility safety, the resin pressure was made to be 12 MPa as the upper limit in the measurement.

[Specific Energy]

The specific energy (kWh/kg) in extrusion was measured under the same condition as in the resin pressure measurement. Here, the specific energy, as indicated by its unit, refers to an electric energy necessary for extruding 1 kg of a resin, and a lower numerical value thereof indicates better processability (more cost reduction). Compositions alarm-activated due to the resin pressure being 12 MPa or more were classified as "unmeasurable".

Example 1

The solid catalyst Z1 at a rate of 0.70 mmol/h in terms of Ti atom, triethylaluminum at a rate of 10 mmol/h in terms of Al atom and hexane at a rate of 40 L/h were introduced in a stainless steel polymerization vessel 1 of 300 L in reaction volume under the condition of a polymerization temperature of 83° C. and a polymerization pressure of 0.39 MPa. Hydrogen was used as a molecular weight regulator; and ethylene and hydrogen were fed so that the gas phase molar concentration (hydrogen/(ethylene+hydrogen)) of hydrogen to the sum of ethylene and hydrogen became 41.1% by mol, and the polymerization was carried out to thereby obtain a component (A).

The polymer slurry solution in the polymerization vessel 1 was introduced to a flash drum of 0.05 MPa in pressure and 70° C. in temperature to thereby separate unreacted ethylene and hydrogen, and thereafter introduced in a stainless steel polymerization vessel 2 of 250 L in reaction volume by being pressurized by a slurry pump. The polymerization vessel 2 was set at a temperature of 80° C. and at a pressure of 0.27 MPa; and hydrogen was used as a molecular weight regulator, and ethylene and hydrogen were fed so that the gas phase molar concentration (hydrogen/(ethylene+hydrogen)) of hydrogen to the sum of ethylene and hydrogen became 5.93% by mol, and the polymerization was carried out to thereby obtain a component (B). The polymerization was carried out so that the mass ratio of the mass of the component (B) produced in the polymerization vessel 2 to the sum of the mass of the component (A) produced in the polymerization vessel 1 and the mass of the component (B) produced in the polymerization vessel 2 became 0.50.

The mass ratio=(the mass of a component produced in the polymerization vessel 2)/(the mass of a low-molecular weight component produced in the polymerization vessel 1+the mass of the component produced in the polymerization vessel 2)

The mixture of the component (A) and the component (B) produced was blended with 2,400 ppm of calcium stearate, 1,500 ppm of pentaerythrityl-tetrakis-[3-(3,5-di-t-butyl-4-hydroxyphenyl)propionate] and 1,500 ppm of tris(2,4-di-t-butylphenyl) phosphite, and by using a twin-screw extruder (TEX44HCT-49PW-7V, made by Japan Steel Works, Ltd.) whose cylinder diameter was 44 mm, was extruded under kneading under the condition of a cylinder temperature of 200° C. and an extrusion volume of 35 kg/h, to thereby obtain a polyethylene resin composition. By using the polyethylene resin composition, a microporous film was fabricated and evaluated by the above methods. The evaluation results are shown in Table 2.

Examples 2 to 6

Polyethylene resin compositions and microporous films were obtained by the same operation as in Example 1, except for altering the polymerization temperature, the catalyst and its introduction amount, the gas phase molar concentration of hydrogen to the sum of ethylene and hydrogen, the polymerization pressure and the mass ratio of the component (B) according to Table 1. The evaluation results are shown in Table 2.

Example 7

In order to produce a component (A), the solid catalyst Z2 at a rate of 0.39 mmol/h in terms of Ti atom, triethylaluminum at a rate of 10 mmol/h in terms of Al atom and hexane at a rate of 40 L/h were introduced in a stainless steel polymerization vessel 1 of 300 L in reaction volume under the condition of a polymerization temperature of 83° C. and a polymerization pressure of 0.80 MPa. Hydrogen was used as a molecular weight regulator; and ethylene and hydrogen were fed so that the gas phase molar concentration (hydrogen/(ethylene+hydrogen)) of hydrogen to the sum of ethylene and hydrogen became 41.1% by mol, and the polymerization was carried out.

In order to produce a component (B), the solid catalyst Z2 at a rate of 0.39 mmol/h in terms of Ti atom, triethylaluminum at a rate of 10 mmol/h in terms of Al atom and hexane at a rate of 40 L/h were introduced similarly in the polymerization vessel 1 under the condition of a polymerization temperature of 83° C. and a polymerization pressure of 0.80 MPa. Hydrogen was used as a molecular weight regulator; and ethylene and hydrogen were fed so that the gas phase molar concentration (hydrogen/(ethylene+hydrogen)) of hydrogen to the sum of ethylene and hydrogen became 14.3% by mol, and the polymerization was carried out.

After the component (A) and the component (B) were produced, these were blended so that the component (A) became 30% by mass and the component (B) became 70% by mass, and further blended with 2,400 ppm of calcium stearate, 1,500 ppm of pentaerythrityl-tetrakis-[3-(3,5-di-t-butyl-4-hydroxyphenyl) propionate] and 1,500 ppm of tris(2,4-di-t-butylphenyl) phosphite, and mixed for 15 min by using a 30-L drum blender. The mixture was, by using a twin-screw extruder (TEX44HCT-49PW-7V, made by Japan Steel Works, Ltd.), extruded under kneading under the condition of a cylinder temperature of 200° C. and an extrusion volume of 35 kg/h, to thereby obtain a polyethylene resin composition. By using the polyethylene resin composition, a microporous film was fabricated and evaluated by the above methods. The results are shown in Table 2.

Example 8

A polyethylene resin composition and a microporous film were obtained by the same operations as in Example 1, except for altering the polymerization pressure, and the gas phase molar concentration of hydrogen to the sum of ethylene and hydrogen according to Table 1. The evaluation results are shown in Table 2.

Example 9

Hexane was introduced at a rate of 90 L/h in a stainless steel polymerization vessel 1 of 300 L in reaction volume under the condition of a polymerization temperature of 60° C. and a polymerization pressure of 0.32 MPa; the metallocene-carrying catalyst [A] was introduced at a rate of 8.4 g/h therein; and the liquid component [B] was introduced therein so that the total concentration of Mg and Al in the reactor became 0.1 mmol/L. Hydrogen was used as a molecular weight regulator; and ethylene and hydrogen were fed so that the gas phase molar concentration (hydrogen/(ethylene+hydrogen)) of hydrogen to the sum of ethylene and hydrogen became 0.43% by mol, and the polymerization was carried out to thereby obtain a component (A).

The slurry solution containing the component (A) in the polymerization vessel 1 was introduced to a flash drum of 0.05 MPa in pressure and 70° C. in temperature to thereby separate unreacted ethylene and hydrogen, and thereafter introduced in a stainless steel polymerization vessel 2 of 250 L in reaction volume by being pressurized by a slurry pump. The polymerization vessel 2 was set at a temperature of 75° C. and at a pressure of 0.40 MPa; and hydrogen was used as a molecular weight regulator, and the raw materials were fed so that the gas phase molar concentration (hydrogen/(ethylene+hydrogen)) of hydrogen to the sum of ethylene and hydrogen became 0.049% by mol, and the polymerization was carried out to thereby obtain a component (B). The polymerization was carried out so that the mass ratio of the mass of the component (B) produced in the polymerization vessel 2 to the sum of the mass of the component (A) produced in the polymerization vessel 1 and the mass of the component (B) produced in the polymerization vessel 2 became 0.50. By using the mixture of the component (A) and the component (B) produced, a polyethylene resin composition and a microporous film were obtained by the same methods as in Example 1. The evaluation results are shown in Table 2.

Example 10

A polyethylene resin composition and a microporous film were obtained by the same operations as in Example 9, except for altering the gas phase molar concentration of hydrogen to the sum of ethylene and hydrogen, the polymerization temperature and the polymerization pressure according to Table 1. The evaluation results are shown in Table 2.

Example 11

In order to produce a component (A), the solid catalyst Z1 at a rate of 0.39 mmol/h in terms of Ti atom, triethylaluminum at a rate of 10 mmol/h in terms of Al atom and hexane at a rate of 40 L/h were introduced in a stainless steel polymerization vessel 1 of 300 L in reaction volume under the condition of a polymerization temperature of 83° C. and a polymerization pressure of 0.80 MPa. Hydrogen was used as a molecular weight regulator; and ethylene and hydrogen were fed so that the gas phase molar concentration (hydrogen/(ethylene+hydrogen)) of hydrogen to the sum of ethylene and hydrogen became 41.1% by mol, and the polymerization was carried out.

In order to produce a component (B), hexane was introduced at a rate of 40 L/h in the polymerization vessel 1 under the condition of a polymerization temperature of 80° C. and a polymerization pressure of 0.98 MPa; the metallocene-carrying catalyst [A] was introduced at a rate of 0.4 g/h therein; and the liquid component [B] was introduced therein so that the total concentration of Mg and Al in the reactor became 0.1 mmol/L. Hydrogen was used as a molecular weight regulator; and the raw materials were fed so that the gas phase molar concentration (hydrogen/(ethylene+hydrogen)) of hydrogen to the sum of ethylene and hydrogen became 0.067% by mol, and the polymerization was carried out.

After the component (A) and the component (B) were produced, these were blended so that the component (A) became 30% by mass and the component (B) became 70% by mass; and the additives were mixed and the mixture was mixed and extruded as in Example 7 to thereby produce a polyethylene resin composition. By using the polyethylene resin composition, a microporous film was fabricated and evaluated by the above methods. The results are shown in Table 2.

TABLE 1

|  |  | Example 1 | Example 2 | Example 3 | Example 4 | Example 5 | Example 6 |
|---|---|---|---|---|---|---|---|
| Component A | Polymerization Method | multistage | multistage | multistage | multistage | multistage | multistage |
|  | Polymerization Temperature (° C.) | 83 | 83 | 83 | 83 | 83 | 83 |
|  | Polymerization Pressure (MPa) | 0.39 | 0.39 | 0.39 | 0.44 | 0.44 | 0.44 |
|  | Catalyst | Ziegler Z1 0.70 mmol/hr | Ziegler Z1 0.70 mmol/hr | Ziegler Z1 0.70 mmol/hr | Ziegler Z2 0.39 mmol/hr | Ziegler Z2 0.39 mmol/hr | Ziegler Z2 0.39 mmol/hr |
|  | Hydrogen/(Ethylene + Hydrogen) (% by mol) | 41.1 | 33.1 | 18.3 | 37.9 | 37.1 | 43.5 |
| Component B | Polymerization Temperature (° C.) | 80 | 80 | 80 | 80 | 80 | 80 |
|  | Polymerization Pressure (MPa) | 0.27 | 0.27 | 0.27 | 0.32 | 0.30 | 0.30 |
|  | Catalyst |  |  |  |  |  |  |
|  | Hydrogen/(Ethylene + Hydrogen) (% by mol) | 5.93 | 6.15 | 7.83 | 7.80 | 9.01 | 3.70 |
| Mass Ratio of Component (B) (%) |  | 50 | 50 | 50 | 40 | 30 | 30 |

|  |  | Example 7 | Example 8 | Example 9 | Example 10 | Example 11 |
|---|---|---|---|---|---|---|
| Component A | Polymerization Method | mixing | multistage | multistage | multistage | mixing |
|  | Polymerization Temperature (° C.) | 83 | 83 | 60 | 60 | 83 |
|  | Polymerization Pressure (MPa) | 0.80 | 0.47 | 0.32 | 0.32 | 0.80 |
|  | Catalyst | Ziegler Z2 0.39 mmol/hr | Ziegler Z1 0.70 mmol/hr | metallocene 8.4 g/hr | metallocene 8.4 g/hr | Ziegler Z1 0.39 mmol/hr |
|  | Hydrogen/(Ethylene + Hydrogen) (% by mol) | 41.1 | 49.0 | 0.43 | 0.175 | 41.1 |
| Component B | Polymerization Temperature (° C.) | 83 | 80 | 75 | 80 | 80 |
|  | Polymerization Pressure (MPa) | 0.80 | 0.27 | 0.40 | 0.27 | 0.98 |
|  | Catalyst | Ziegler Z2 0.39 mmol/hr |  |  |  | metallocene 0.4 g/hr |
|  | Hydrogen/(Ethylene + Hydrogen) (% by mol) | 14.3 | 4.10 | 0.049 | 0.082 | 0.067 |
| Mass Ratio of Component (B) (%) |  | 70 | 50 | 50 | 50 | 70 |

(*)
Multistage: a method of producing a component (B) in the presence of a component (A) after the component (A) was produced.
Mixing: a method of independently producing a component (A) and a component (B) and then mixing these.

TABLE 2

|  |  |  | Example 1 | Example 2 | Example 3 | Example 4 | Example 5 | Example 6 |
|---|---|---|---|---|---|---|---|---|
| Component (A) | MFR (g/10 min) |  | 49.8 | 20.1 | 4.93 | 4.80 | 4.43 | 5.09 |
|  | Density (kg/cm$^3$) |  | 969 | 968 | 965 | 966 | 966 | 966 |
|  | Content (% by weight) |  | 50 | 50 | 50 | 60 | 70 | 70 |
|  | Kind of a Catalyst |  | Ziegler Z1 | Ziegler Z1 | Ziegler Z1 | Ziegler Z2 | Ziegler Z2 | Ziegler Z2 |
| Component (B) | MFR (g/10 min) (calculated value) |  | 0.015 | 0.017 | 0.028 | 0.010 | 0.013 | 0.002 |
|  | Content (% by weight) |  | 50 | 50 | 50 | 40 | 30 | 30 |
|  | Kind of a Catalyst |  | Ziegler Z1 | Ziegler Z1 | Ziegler Z1 | Ziegler Z2 | Ziegler Z2 | Ziegler Z2 |
| Polyethylene Resin Composition | MFR (g/10 min) |  | 0.23 | 0.21 | 0.21 | 0.18 | 0.39 | 0.13 |
|  | Density (kg/cm$^3$) |  | 964 | 963 | 961 | 962 | 963 | 962 |
|  | Content of α-Olefin Unit (% by mol) |  |  |  |  | below detection limit |  |  |
|  | GPC | Mw | 1.92E+05 | 2.09E+05 | 2.12E+05 | 2.33E+05 | 2.01E+05 | 2.65E+05 |
|  |  | Mn | 1.33E+04 | 1.51E+04 | 1.89E+04 | 1.61E+04 | 1.42E+04 | 1.50E+04 |
|  |  | Mw/Mn | 14.4 | 13.4 | 11.2 | 14.5 | 14.2 | 17.7 |
|  |  | Mv | 1.19E+05 | 1.32E+05 | 1.37E+05 | 1.45E+05 | 1.21E+05 | 1.58E+05 |
|  |  | molecular weight of 1,000,000 or more (% by mass) | 3.6 | 3.7 | 3.4 | 4.1 | 3.2 | 4.9 |
|  | CFC | extraction volume of 40° C. or more and less than 91° C.: S1 (% by mass) | 12.2 | 9.2 | 6.3 | 7.6 | 8.1 | 9.4 |

TABLE 2-continued

|  |  |  |  |  |  |  |
|---|---|---|---|---|---|---|
| | extraction volume of 91° C. or more and less than 100° C.: S2 (% by mass) | 45.5 | 47.6 | 48.8 | 46.6 | 53.0 | 46.4 |
| | extraction volume of 100° C. or more and less than 105° C.: S3 (% by mass) | 41.5 | 42.4 | 44.1 | 42.1 | 38.0 | 40.4 |
| | extraction volume of 105° C. or more and less than 120° C.: S4 (% by mass) | 0.8 | 0.8 | 0.8 | 3.7 | 0.9 | 3.8 |
| Melt Viscosity (180° C.) | (Pa · s) (shear rate: 533 sec$^{-1}$) | 331 | 377 | 396 | 404 | 399 | 348 |
| Processability | Resin Pressure (MPa) | 9.7 | 10.3 | 10.6 | 9.3 | 7.4 | 8.8 |
| | Specific Energy (kWh/kg) | 0.141 | 0.154 | 0.160 | 0.150 | 0.133 | 0.141 |
| Air Permeability | (sec/100 cc) (in terms of 50% in porosity and 20 μm in thickness) | 271 | 290 | 311 | 300 | 267 | 274 |
| Piercing Strength | (g) (in terms of 50% in porosity and 20 μm in thickness) | 347 | 352 | 357 | 313 | 288 | 297 |
| Variation in Film Thickness | | Excellent | Excellent | Excellent | Excellent | Excellent | Good |

|  |  | Example 7 | Example 8 | Example 9 | Example 10 | Example 11 |
|---|---|---|---|---|---|---|
| Component (A) | MFR (g/10 min) | 5.10 | 95.3 | 49.1 | 5.5 | 5.1 |
| | Density (kg/cm$^3$) | 966 | 970 | 968 | 964 | 966 |
| | Content (% by weight) | 30 | 50 | 50 | 50 | 30 |
| | Kind of a Catalyst | Ziegler Z2 | Ziegler Z1 | metallocene | metallocene | Ziegler Z1 |
| Component (B) | MFR (g/10 min) (calculated value) | 0.080 | 0.013 | 0.012 | 0.113 | 0.114 |
| | Content (% by weight) | 70 | 50 | 50 | 50 | 70 |
| | Kind of a Catalyst | Ziegler Z2 | Ziegler Z1 | metallocene | metallocene | metallocene |
| Polyethylene Resin Composition | MFR (g/10 min) | 0.28 | 0.24 | 0.20 | 0.57 | 0.36 |
| | Density (kg/cm$^3$) | 959 | 965 | 961 | 960 | 959 |
| | Content of α-Olefin Unit (% by mol) | below detection limit | | | | |
| GPC | Mw | 2.16E+05 | 1.93E+05 | 1.67E+05 | 1.30E+05 | 1.55E+05 |
| | Mn | 1.96E+04 | 1.17E+04 | 1.57E+04 | 2.00E+04 | 2.09E+04 |
| | Mw/Mn | 11.0 | 16.6 | 10.6 | 6.5 | 7.4 |
| | Mv | 1.34E+05 | 1.19E+05 | 1.10E+05 | 9.23E+04 | 1.09E+05 |
| | molecular weight of 1,000,000 or more (% by mass) | 1.2 | 3.6 | 1.5 | 1.4 | 1.6 |
| CFC | extraction volume of 40° C. or more and less than 91° C.: S1 (% by mass) | 3.8 | 13.9 | 3.4 | 4.7 | 3.9 |
| | extraction volume of 91° C. or more and less than 100° C.: S2 (% by mass) | 45.9 | 46.9 | 56.4 | 55.9 | 55.2 |
| | extraction volume of 100° C. or more and less than 105° C.: S3 (% by mass) | 49.4 | 38.6 | 38.4 | 36.9 | 38.2 |
| | extraction volume of 105° C. or more and less than 120° C.: S4 (% by mass) | 0.9 | 0.6 | 1.8 | 2.5 | 2.7 |
| Melt Viscosity (180° C.) | (Pa · s) (shear rate: 533 sec$^{-1}$) | 333 | 301 | 346 | 407 | 417 |
| Processability | Resin Pressure (MPa) | 10.9 | 8.6 | 10.1 | 8.7 | 9.7 |
| | Specific Energy (kWh/kg) | 0.169 | 0.133 | 0.157 | 0.159 | 0.155 |
| Air Permeability | (sec/100 cc) (in terms of 50% in porosity and 20 μm in thickness) | 341 | 254 | 287 | 292 | 297 |
| Piercing Strength | (g) (in terms of 50% in porosity and 20 μm in thickness) | 312 | 300 | 359 | 326 | 348 |

TABLE 2-continued

| | | | | | |
|---|---|---|---|---|---|
| Variation in Film Thickness | Good | Excellent | Excellent | Good | Good |

Comparative Example 1

A polyethylene resin composition and a microporous film were obtained by the same methods as in Example 1, except for altering the gas phase molar concentration of hydrogen to the sum of ethylene and hydrogen according to Table 3. The evaluation results are shown in Table 4. Comparative Example 1 exhibited a low value of the piercing strength.

Comparative Example 2

A polyethylene resin composition and a microporous film were obtained by the same methods as in Example 1, except for altering the gas phase molar concentration of hydrogen to the sum of ethylene and hydrogen according to Table 3. The evaluation results are shown in Table 4. Comparative Example 2 exhibited such results that the resin pressure had a high value; also the air permeability had a high value; and the processability and the air permeation were low.

Comparative Example 3

A polyethylene resin composition was produced by the same method as in Example 7, except for making the blend ratio of the component (A) and the component (B) to be 20% by mass: 80% by mass. The obtained polyethylene resin composition contained 5.6% by mass of components having a molecular weight of 1,000,000 or more. By using the polyethylene resin composition, a microporous film was fabricated and evaluated by the above methods. The results are shown in Table 4. Comparative Example 3 exhibited such results that the resin pressure had a high value; also the air permeability had a high value; and the processability and the air permeation were low.

Comparative Example 4

Production of a polyethylene resin composition was attempted by the same method as in Example 7, except for making the blend ratio of the component (A) and the component (B) to be 80% by mass: 20% by mass. In Comparative Example 4, mixing failure (dispersion failure) of the component (A) and the component (B) in the extrusion was caused and made taking-up of the strand difficult, so pellets of the polyethylene resin composition could not be obtained. Therefore, no evaluation of a microporous film was reached.

Comparative Example 5

A polyethylene resin composition and a microporous film were obtained by the same operations as in Example 1, except for introducing 1-butene as a comonomer so that the gas phase molar concentration (1-butene/(ethylene+1-butene)) of 1-butene to the sum of ethylene and 1-butene became 1.01% by mol, in the production of a component (A), and altering the polymerization temperature, the catalyst and its introducing amount, the gas phase molar concentration of hydrogen to the sum of ethylene and hydrogen, the polymerization pressure, and the mass ratio of the component (B) according to Table 3. The evaluation results are shown in Table 4. Comparative Example 5 exhibited a porosity of about 40% and a high air permeability of 10,000 sec/100 cc or more, even when the stretching was carried out by 2.5 times in the heat stretching step. Since the porosity was too low, the piercing strength (in terms of 50% in porosity and 20 μm in thickness) was determined to be unmeasurable. The variation in the film thickness was large.

Comparative Example 6

A polyethylene resin composition and a microporous film were obtained by the same operations as in Example 1, except for introducing 1-butene as a comonomer so that the gas phase molar concentration (1-butene/(ethylene+1-butene)) of 1-butene to the sum of ethylene and 1-butene became 2.06% by mol, in the production of a component (B), and altering the polymerization temperature, the catalyst and its introducing amount, the gas phase molar concentration of hydrogen to the sum of ethylene and hydrogen, the polymerization pressure, and the mass ratio of the component (B) according to Table 3. The evaluation results are shown in Table 4. Comparative Example 6 exhibited a porosity of about 35% and a high air permeability of 10,000 sec/100 cc or more, even when the stretching was carried out by 2.5 times in the heat stretching step. Since the porosity was too low, the piercing strength (in terms of 50% in porosity and 20 μm in thickness) was determined to be unmeasurable. The variation in the film thickness was large.

Comparative Example 7

A polyethylene resin composition and a microporous film were obtained by the same operations as in Example 1, except for introducing 1-butene as a comonomer so that the gas phase molar concentration (1-butene/(ethylene+1-butene)) of 1-butene to the sum of ethylene and 1-butene became 0.40% by mol, in the production of a component (B), and altering the polymerization temperature, the catalyst and its introducing amount, the gas phase molar concentration of hydrogen to the sum of ethylene and hydrogen, the polymerization pressure, and the mass ratio of the component (B) according to Table 3. The evaluation results are shown in Table 4. Comparative Example 7 exhibited a high air permeability and a low air permeation. The variation in the film thickness was large.

Comparative Example 8

A polyethylene resin composition and a microporous film were obtained by the same methods as in Example 1, except for altering the gas phase molar concentration of hydrogen to the sum of ethylene and hydrogen according to Table 3. The evaluation results are shown in Table 4. Comparative Example 8 exhibited a low value of the piercing strength.

Comparative Example 9

A polyethylene resin composition and a microporous film were obtained by the same methods as in Example 1, except for altering the gas phase molar concentration of hydrogen to the sum of ethylene and hydrogen according to Table 3. The polyethylene resin composition contained 5.2% by mass of components having a molecular weight of 1,000,000 or more. The evaluation results are shown in Table 4. Comparative Example 9 exhibited a high value of the resin pressure, and a high value of the air permeability. Further, the variation in the film thickness was large and the processability and the air permeation were low.

Comparative Example 10

A polyethylene resin composition and a microporous film were obtained by the same methods as in Example 9, except for altering the polymerization temperature, the gas phase molar concentration of hydrogen to the sum of ethylene and hydrogen, the polymerization pressure, and the mass ratio of the component (B) according to Table 3. The evaluation results are shown in Table 4. Comparative Example 10 exhibited a low value of the piercing strength.

Comparative Example 11

In order to produce a polyethylene resin composition by polymerization using only one stage, the solid catalyst Z2 at a rate of 0.39 mmol/h in terms of Ti atom, triethylaluminum at a rate of 10 mmol/h in terms of Al atom and hexane at a rate of 40 L/h were introduced in a stainless steel polymerization vessel 1 of 300 L in reaction volume under the condition of a polymerization temperature of 83° C. and a polymerization pressure of 0.80 MPa. Hydrogen was used as a molecular weight regulator; and ethylene and hydrogen were fed so that the gas phase molar concentration (hydrogen/(ethylene+hydrogen)) of hydrogen to the sum of ethylene and hydrogen became 21.3% by mol, and the polymerization was carried out.

By using the polyethylene resin composition obtained in Comparative Example 11, a microporous film was fabricated and evaluated by the above methods. The results are shown in Table 4. Comparative Example 11 exhibited a high value of the resin pressure, and a high value of the air permeability. Further the variation in the film thickness had a large value, and the processability and the air permeation were low.

Comparative Example 12

In order to produce a polyethylene resin composition by polymerization using only one stage, hexane was introduced at a rate of 40 L/h in a stainless steel polymerization vessel 1 of 300 L in reaction volume under the condition of a polymerization temperature of 80° C. and a polymerization pressure of 0.98 MPa; the metallocene-carrying catalyst [A] was introduced at a rate of 8.4 g/h therein; and the liquid component [B] was introduced therein so that the total concentration of Mg and Al in the reactor became 0.1 mmol/L. Hydrogen was used as a molecular weight regulator; and the raw materials were fed so that the gas phase molar concentration (hydrogen/(ethylene+hydrogen)) of hydrogen to the sum of ethylene and hydrogen became 0.093% by mol, and the polymerization was carried out.

By using the polyethylene resin composition obtained in Comparative Example 12, a microporous film was fabricated and evaluated by the above methods. The results are shown in Table 4. Comparative Example 12 exhibited a porosity of about 35% and a high air permeability of 10,000 sec/100 cc or more, even when the stretching was carried out by 2.5 times in the heat stretching step. Since the porosity was too low, the piercing strength (in terms of 50% in porosity and 20 μm in thickness) was determined to be unmeasurable. The variation in the film thickness was large.

Figure 3:
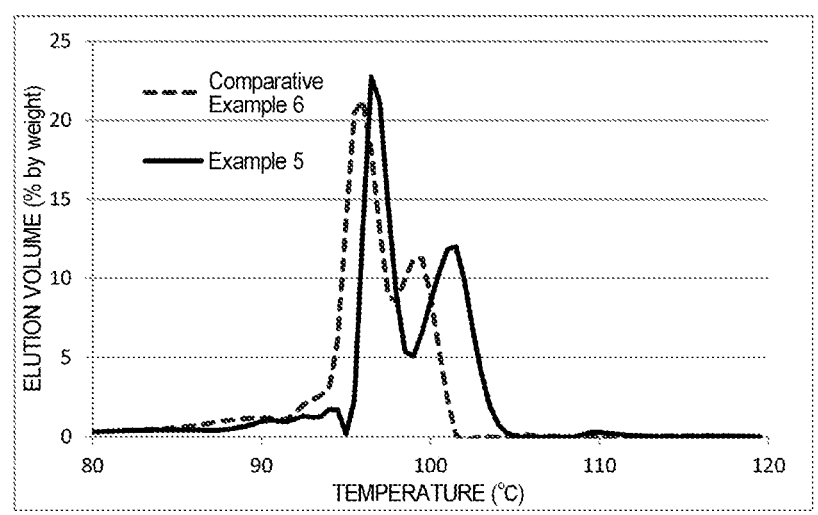
FIG. 3 is temperature-elution volume curves acquired in Example 5 and Comparative Example 6.

As measurement examples of CFC measurement, temperature-elution volume curves of Example 5 and Comparative Example 6 are shown in FIG. 3.

TABLE 3

|  |  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| | Polymerization Method | multistage | multistage | mixing | mixing | multistage | multistage |
| Component A | Polymerization Temperature (° C.) | 83 | 83 | 83 | 83 | 83 | 83 |
| | Polymerization Pressure (MPa) | 0.61 | 0.39 | 0.8 | 0.8 | 0.43 | 0.44 |
| | Catalyst | Ziegler Z1 0.7 mmol/hr | Ziegler Z1 0.7 mmol/hr | Ziegler Z2 0.39 mmol/hr | Ziegler Z2 0.39 mmol/hr | Ziegler Z2 0.34 mmol/hr | Ziegler Z2 0.39 mmol/hr |
| | Hydrogen/ (Ethylene + Hydrogen) (% by mol) | 60.5 | 3.7 | 41.1 | 41.1 | 38.2 | 42.5 |
| | Comonomer | | | | | 1-butene 1.01 mol % | |
| Component B | Polymerization Temperature (° C.) | 80 | 80 | 83 | 83 | 70 | 80 |
| | Polymerization Pressure (MPa) | 0.27 | 0.27 | 0.80 | 0.80 | 0.50 | 0.23 |
| | Catalyst | | | Ziegler Z2 0.39 mmol/hr | Ziegler Z2 0.39 mmol/hr | | |
| | Hydrogen/ (Ethylene + Hydrogen) (% by mol) | 3.18 | 10.8 | 14.3 | 14.3 | 5.80 | 2.80 |
| | Comonomer | | | | | | 1-butene 2.06 mol % |
| | Mass Ratio of Component (B) (%) | 50 | 50 | 80 | 20 | 30 | 30 |

TABLE 3-continued

|  |  | Comp. Ex. 7 | Comp. Ex. 8 | Comp. Ex. 9 | Comp. Ex. 10 | Comp. Ex. 11 | Comp. Ex. 12 |
|---|---|---|---|---|---|---|---|
|  | Polymerization Method | multistage | multistage | multistage | multistage | one-stage | one-stage |
| Component A | Polymerization Temperature (° C.) | 83 | 83 | 83 | 70 |  |  |
|  | Polymerization Pressure (MPa) | 0.44 | 0.39 | 0.39 | 0.43 |  |  |
|  | Catalyst | Ziegler Z2 0.39 mmol/hr | Ziegler Z1 0.70 mmol/hr | Ziegler Z1 0.7 mmol/hr | metallocene 8.4 g/hr |  |  |
|  | Hydrogen/ (Ethylene + Hydrogen) (% by mol) | 40.8 | 18.3 | 18.3 | 0.57 |  |  |
|  | Comonomer |  |  |  |  |  |  |
| Component B | Polymerization Temperature (° C.) | 80 | 80 | 80 | 75 | 83 | 80 |
|  | Polymerization Pressure (MPa) | 0.23 | 0.27 | 0.27 | 0.73 | 0.80 | 0.98 |
|  | Catalyst |  |  |  |  | Ziegler Z2 0.39 mmol/hr | metallocene 8.4 g/hr |
|  | Hydrogen/ (Ethylene + Hydrogen) (% by mol) | 6.10 | 15.3 | 2.98 | 0.042 | 21.3 | 0.093 |
|  | Comonomer | 1-butene 0.40 mol % |  |  |  |  |  |
| Mass Ratio of Component (B) (%) |  | 40 | 50 | 50 | 45 | 100 | 100 |

(*)
Multistage: a method of producing a component (B) in the presence of a component (A) after the component (A) was produced.
Mixing: a method of independently producing a component (A) and a component (B) and then mixing these.
One-stage: a method of producing one component alone and making it as a polyethylene resin composition.

TABLE 4

|  |  |  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|
| Component (A) | MFR (g/10 min) |  | 350.2 | 1.10 | 5.10 | 5.10 | 4.88 | 5.03 |
|  | Density (kg/cm³) |  | 974 | 963 | 966 | 966 | 959 | 967 |
|  | Content (% by weight) |  | 50 | 50 | 20 | 80 | 70 | 70 |
|  | Kind of a Catalyst |  | Ziegler Z1 | Ziegler Z1 | Ziegler Z2 | Ziegler Z2 | Ziegler Z2 | Ziegler Z2 |
| Component (B) | MFR (g/10 min) (calculated value) |  | 0.044 | 0.038 | 0.080 | 0.080 | 0.004 | 0.003 |
|  | Content (% by weight) |  | 50 | 50 | 80 | 20 | 30 | 30 |
|  | Kind of a Catalyst |  | Ziegler Z1 | Ziegler Z1 | Ziegler Z2 | Ziegler Z2 | Ziegler Z2 | Ziegler Z2 |
| Polyethylene Resin Composition | MFR (g/10 min) |  | 0.28 | 0.16 | 0.18 | unmeasureable due to pellet mixing failure | 0.20 | 0.18 |
|  | Density (kg/cm³) |  | 965 | 959 | 958 |  | 958 | 957 |
|  | Content of α-Olefin Unit (% by mol) |  | below detection lower limit |  |  |  | 0.18 | 0.32 |
|  | GPC | Mw | 1.94E+05 | 2.38E+05 | 2.67E+05 |  | 2.33E+05 | 2.27E+05 |
|  |  | Mn | 9.48E+04 | 2.18E+04 | 2.00E+04 |  | 1.47E+04 | 1.50E+04 |
|  |  | Mw/Mn | 20.5 | 10.9 | 13.4 |  | 15.9 | 15.2 |
|  |  | Mv | 1.23E+05 | 1.45E+05 | 1.59E+05 |  | 1.43E+05 | 1.39E+05 |
|  |  | molecular weight of 1,000,000 or more (% by mass) | 3.7 | 3.5 | 5.6 |  | 4.0 | 4.1 |
|  | CFC | extraction volume of 40° C. or more and less than 91° C.: S1 (% by mass) | 20.0 | 1.7 | 2.6 |  | 16.8 | 12.0 |
|  |  | extraction volume of 91° C. or more and less than 100° C.: S2 (% by mass) | 54.5 | 36.5 | 38.9 |  | 71.9 | 70.4 |
|  |  | extraction volume of 100° C. or more and less than 105° C.: S3 (% by mass) | 25.3 | 61 | 54.7 |  | 10.4 | 17.0 |
|  |  | extraction volume of 105° C. or more and less than 120° C.: S4 (% by mass) | 0.2 | 0.8 | 3.8 |  | 0.9 | 0.6 |

TABLE 4-continued

|  |  |  |  |  |  |  |  |
|---|---|---|---|---|---|---|---|
| Melt Viscosity (180° C.) | (Pa · s) (shear rate: 533 sec$^{-1}$) | 253 | 446 | 433 | — | 362 | 466 |
| Processability | Resin Pressure (MPa) | 6.6 | 12 or more | 12 or more | — | 7.0 | 8.9 |
|  | Specific Energy (kWh/kg) | 0.110 | unmeasurable | unmeasurable | — | 0.130 | 0.161 |
| Air Permeability | (sec/100 cc) (in terms of 50% in porosity and 20 μm in thickness) | 246 | 684 | 426 | — | ≥10,000 | ≥10,000 |
| Piercing Strength | (g) (in terms of 50% in porosity and 20 μm in thickness) | 213 | 331 | 322 | — | unmeasurable | unmeasurable |
| Variation in Film Thickness |  | Excellent | Fair | Fair | — | Poor | Poor |

|  |  | Comp. Ex. 7 | Comp. Ex. 8 | Comp. Ex. 9 | Comp. Ex. 10 | Comp. Ex. 11 | Comp. Ex. 12 |
|---|---|---|---|---|---|---|---|
| Component (A) | MFR (g/10 min) | 4.70 | 4.93 | 4.93 | 509 | — | — |
|  | Density (kg/cm$^3$) | 966 | 965 | 965 | 974 | — | — |
|  | Content (% by weight) | 60 | 50 | 50 | 55 | — | — |
|  | Kind of a Catalyst | Ziegler Z2 | Ziegler Z1 | Ziegler Z1 | metallocene | — | — |
| Component (B) | MFR (g/10 min) (calculated value) | 0.009 | 0.193 | 0.007 | 0.016 | 0.230 | 0.220 |
|  | Content (% by weight) | 40 | 50 | 50 | 45 | 100 | 100 |
|  | Kind of a Catalyst | Ziegler Z2 | Ziegler Z1 | Ziegler Z1 | metallocene | Ziegler Z2 | metallocene |
| Polyethylene Resin Composition | MFR (g/10 min) | 0.16 | 0.78 | 0.08 | 0.35 | 0.23 | 0.22 |
|  | Density (kg/cm$^3$) | 958 | 963 | 957 | 960 | 959 | 955 |
|  | Content of α-Olefin Unit (% by mol) | 0.14 | below detection lower limit | | | | |
| GPC | Mw | 2.38E+05 | 1.53E+05 | 2.98E+05 | 1.48E+05 | 2.22E+05 | 1.37E+05 |
|  | Mn | 1.48E+04 | 1.66E+04 | 2.92E+04 | 9.55E+03 | 1.97E+04 | 2.32E+04 |
|  | Mw/Mn | 16.5 | 9.2 | 10.2 | 15.5 | 11.3 | 5.9 |
|  | Mv | 1.44E+05 | 1.03E+05 | 1.74E+05 | 9.45E+04 | 1.37E+05 | 1.06E+05 |
|  | molecular weight of 1,000,000 or more (% by mass) | 4.4 | 2.3 | 5.2 | 2.5 | 3.9 | 2.1 |
| CFC | extraction volume of 40° C. or more and less than 91° C.: S1 (% by mass) | 9.8 | 6.2 | 6.5 | 21.6 | 5.2 | 4.3 |
|  | extraction volume of 91° C. or more and less than 100° C.: S2 (% by mass) | 65.4 | 56.7 | 44.0 | 58.1 | 51.4 | 59.2 |
|  | extraction volume of 100° C. or more and less than 105° C.: S3 (% by mass) | 24.2 | 36.9 | 47.3 | 20.1 | 37.3 | 35.2 |
|  | extraction volume of 105° C. or more and less than 120° C.: S4 (% by mass) | 0.6 | 0.2 | 2.2 | 0.2 | 6.1 | 1.3 |
| Melt Viscosity (180° C.) | (Pa · s) (shear rate: 533 sec$^{-1}$) | 431 | 409 | 517 | 283 | 463 | 480 |
| Processability | Resin Pressure (MPa) | 8.8 | 8.7 | 12 or more | 6.2 | 12 or more | 12 or more |
|  | Specific Energy (kWh/kg) | 0.141 | 0.159 | unmeasurable | 0.110 | unmeasurable | unmeasurable |
| Air Permeability | (sec/100 cc) (in terms of 50% in porosity and 20 μm in thickness) | 654 | 267 | 448 | 254 | 360 | ≥10,000 |
| Piercing Strength | (g) (in terms of 50% in porosity and 20 μm in thickness) | 321 | 240 | 300 | 208 | 290 | unmeasurable |
| Variation in Film Thickness |  | Poor | Excellent | Poor | Excellent | Poor | Poor |

The present application is based on Japanese Patent Application (Japanese Patent Application No. 2013-183906), filed on Sep. 5, 2013 to the Japan Patent Office, and Japanese Patent Application (Japanese Patent Application No. 2013-264114), filed on Dec. 20, 2013 to the Japan Patent Office, the entire contents of which are hereby incorporated by reference.

INDUSTRIAL APPLICABILITY

The polyethylene resin composition according to the present invention is excellent in the processability, and can provide a microporous film excellent in the air permeation, the heat resistance and the mechanical strength. Hence, the polyethylene resin composition can suitably be used as a raw material for a separator for batteries, and the like.

The invention claimed is:

1. A polyethylene resin composition comprising an ethylene homopolymer and having:
 a melt flow rate of 0.10 to 0.60 g/10 min;
 a molecular weight distribution (Mw/Mn) of 6.0 to 20;
 a density of 956 to 970 kg/m$^3$; and
 in a cross-fractionation chromatography measurement using orthodichlorobenzene,
 a cumulative elution volume of 40° C. or more and less than 91° C. of 2.0% by mass or more and 15% by mass or less of a total elution volume;
 a cumulative elution volume of 91° C. or more and less than 100° C. of 40% by mass or more and 60% by mass or less of the total elution volume;
 a cumulative elution volume of 100° C. or more and less than 105° C. of 30% by mass or more and 55% by mass or less of the total elution volume; and
 a cumulative elution volume of 105° C. or more and less than 120° C. of 5.0% by mass or less of the total elution volume.

2. The polyethylene resin composition according to claim 1, wherein the ethylene homopolymer comprises:
 30 to 70% by mass of a component (A) composed of an ethylene homopolymer having a melt flow rate of 3.0 to 300 g/10 min and a density of 962 to 974 kg/m$^3$, and
 70 to 30% by mass of a component (B) composed of an ethylene homopolymer having a melt flow rate different from the melt flow rate of the component (A).

3. The polyethylene resin composition according to claim 1, comprising 5.0% by mass or less of an ethylene homopolymer component having a molecular weight in terms of polyethylene of 1,000,000 or more.

4. A microporous film comprising the polyethylene resin composition according to claim 1.

5. The microporous film according to claim 4, being obtained by a stretching pore-opening method.

6. A separator for a battery comprising the microporous film according to claim 4.

7. A method for manufacturing a microporous film comprising a step of opening pores in the polyethylene resin composition according to claim 1 by a stretching pore-opening method.

8. A microporous film comprising the polyethylene resin composition according to claim 2.

9. The polyethylene resin composition according to claim 2, comprising 5.0% by mass or less of an ethylene homopolymer component having a molecular weight in terms of polyethylene of 1,000,000 or more.

* * * * *